United States Patent [19]
Takaoka et al.

[11] Patent Number: 6,167,328
[45] Date of Patent: Dec. 26, 2000

[54] ROBOT LANGUAGE PROCESSING APPARATUS

[75] Inventors: Keiichi Takaoka; Noriyuki Ohsawa; Noriaki Mantani; Takeyoshi Kanehara; Youichi Tanaka; Fumiaki Kawai, all of Fukuoka, Japan

[73] Assignee: Kabushiki Kaisha Yaskawa Denki, Kitakyushu, Japan

[21] Appl. No.: 09/043,119

[22] PCT Filed: Sep. 19, 1996

[86] PCT No.: PCT/JP96/02691

§ 371 Date: Mar. 18, 1998

§ 102(e) Date: Mar. 18, 1998

[87] PCT Pub. No.: WO97/11416

PCT Pub. Date: Mar. 27, 1997

[30] Foreign Application Priority Data

Sep. 19, 1995 [JP] Japan .................................. 7-266508

[51] Int. Cl.[7] ........................... G05B 15/00; G05B 19/04; G06F 19/00; B25J 9/16
[52] U.S. Cl. ........................ 700/264; 700/245; 700/250; 700/252; 318/568.1
[58] Field of Search .................................... 700/245, 250, 700/264, 252, 123, 86; 901/1, 8, 42; 318/568.1

[56] References Cited

U.S. PATENT DOCUMENTS

| | | | |
|---|---|---|---|
| 4,608,651 | 8/1986 | Murakami | 700/250 |
| 4,972,131 | 11/1990 | Kojyo | 318/568.1 |
| 5,668,930 | 9/1997 | Hamura | 700/252 |
| 5,705,906 | 1/1998 | Tanabe | 318/568.13 |
| 5,937,143 | 8/1999 | Watanabe | 700/264 |
| 5,949,683 | 9/1999 | Akami | 700/123 |
| 5,980,082 | 11/1999 | Watanabe | 700/86 |
| 6,019,606 | 2/2000 | Yamamoto | 434/45 |

FOREIGN PATENT DOCUMENTS

| | | |
|---|---|---|
| 58-114106 | 7/1983 | Japan . |
| 60-107105 | 6/1985 | Japan . |
| 61-279908 | 12/1986 | Japan . |
| 62-75712 | 4/1987 | Japan . |
| 62-121513 | 6/1987 | Japan . |
| 63-269206 | 11/1988 | Japan . |
| 2-176906 | 7/1990 | Japan . |
| 3-3753 | 1/1991 | Japan . |
| 3-154105 | 7/1991 | Japan . |
| 4-109318 | 4/1992 | Japan . |
| 4-167005 | 6/1992 | Japan . |
| 4-169909 | 6/1992 | Japan . |
| 5-53640 | 3/1993 | Japan . |
| 5-43201 | 6/1993 | Japan . |
| 6-114460 | 4/1994 | Japan . |

*Primary Examiner*—William Grant
*Assistant Examiner*—Ronald D Hartman, Jr.
*Attorney, Agent, or Firm*—Oblon, Spivak, McClelland, Maier & Neustadt, P.C.

[57] ABSTRACT

When a robot language is to be displayed and edited, a teaching apparatus or a programming pendant heretofore displays intermediate code of the robot language as expressed by characters. The operator cannot intuitively recognize motions of the robot, needs time to master the robot language, and is required to actually move the robot to confirm the correctness of the program after the robot has been taught. According to the present invention, a robot language processing apparatus includes a display device for graphically displaying a picture and designating a position in the displayed picture with a pointing device, a memory for storing a robot program, a graphical language processor for displaying an operation interval and an air-cut interval as successive lines on the display device by referring to the robot program, and controlling the display device to display the type of an operation detail at either one of the lines when the either one of the displayed lines is designated by the pointing device. The robot language processing apparatus is capable of teaching based on a graphical user interface.

36 Claims, 23 Drawing Sheets

```
N O P
M O V J    ········· POINT p1 MOTION COMMAND  (JOINT OPERATION)
M O V J    ········· POINT p2 MOTION COMMAND  (JOINT OPERATION)
M O V L    ········· POINT p3 MOTION COMMAND
                     (LINEAR INTERPOLATION OPERATION)
M O V L    ········· POINT p4 MOTION COMMAND
                     (LINEAR INTERPOLATION OPERATION)
M O V L    ········· POINT p5 MOTION COMMAND
                     (LINEAR INTERPOLATION OPERATION)
M O V L    ········· POINT p6 MOTION COMMAND
                     (LINEAR INTERPOLATION OPERATION)
M O V J    ········· POINT p7 MOTION COMMAND  (JOINT OPERATION)
M O V J    ········· POINT p8 MOTION COMMAND  (JOINT OPERATION)
E N D
```

Fig. 7

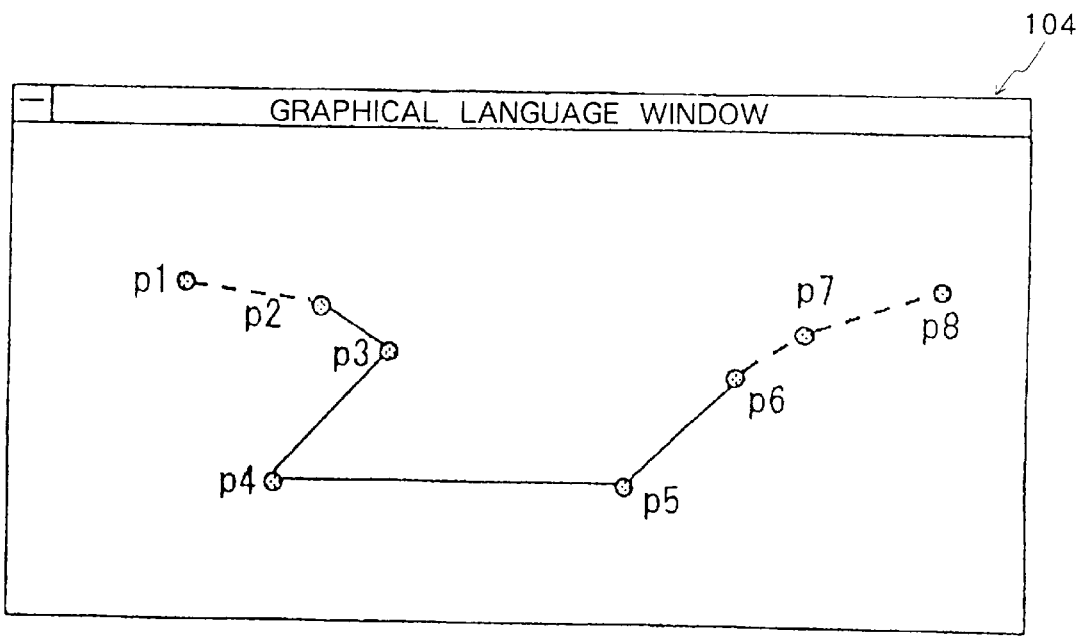

Fig. 8

```
NOP
MOVJ
MOVJ
MOVL
ARCON    ........ WELDING START COMMAND
MOVL
MOVL
MOVL
ARCOF    ........ WELDING END COMMAND
MOVJ
MOVJ
END
```

```
NOP
MOVJ
MOVJ
MOVL
ARCON            ············· WELDING START COMMAND
'arc:joint=lap-joint  ····· INTERNAL CODE : JOINT SHAP = LAP
'arc:thick=3.2t  ············ INTERNAL CODE : THICKNESS = 3.2 mm
MOVL
MOVL
MOVL
ARCOF            ············· WELDING END COMMAND
MOVJ
MOVJ
END
```

```
NOP
MOVJ
MOVJ
MOVL
ARCON                       ······· WELDING START COMMAND
'arc:joint=rap-joint        ······· INTERNAL CODE : JOINT SHAP = LAP
'arc:thick=3.2t             ······· INTERNAL CODE : THICKNESS = 3.2 mm
ARCCUR  AC=200              ······· WELDING CURRENT ESTABLISHING COMMAND :
                                    200 A (AUTOMATIC ESTABLISHMENT)
ARCVOL  AV=30               ······· WELDING VOLTAGE ESTABLISHING COMMAND :
                                    30 V (AUTOMATIC ESTABLISHMENT)
SPEED   v=100               ······· WELDING SPEED ESTABLISHING COMMAND :
                                    100 cm/min (AUTOMATIC ESTABLISHMENT)
MOVL
MOVL
MOVL
ARCOF                       ······· WELDING END COMMAND
MOVJ
MOVJ
END
```

Fig. 13

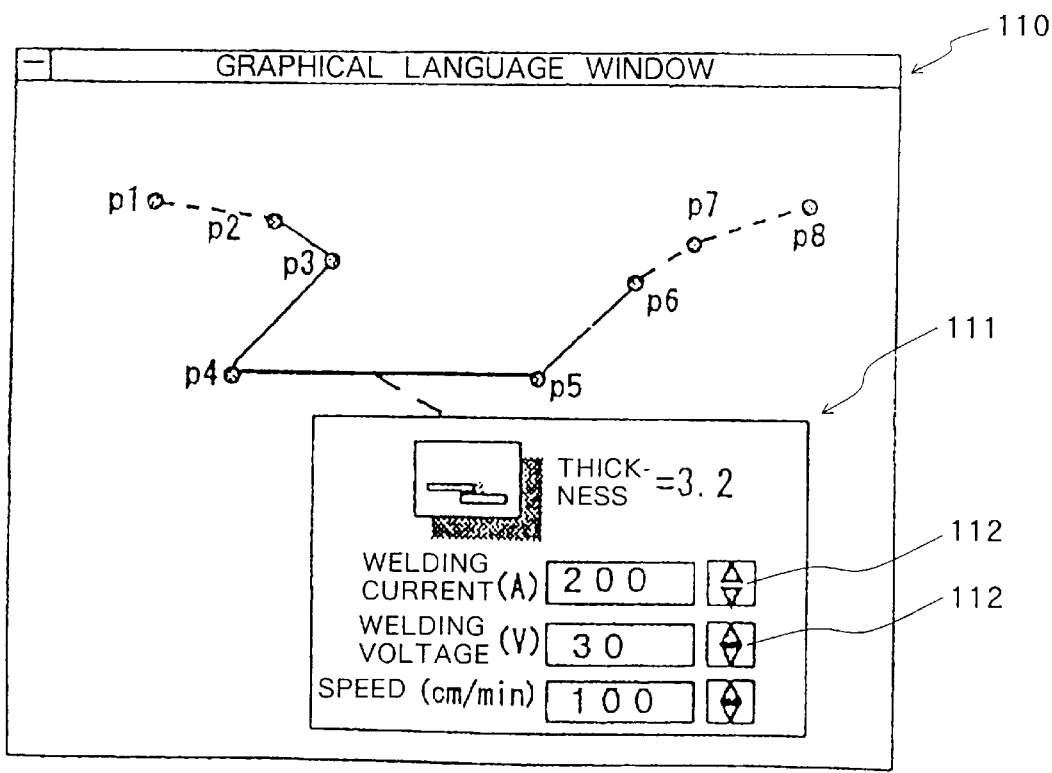

Fig. 14

```
NOP
MOVJ
MOVJ
MOVL
ARCON      ........... ··· WELDING START COMMAND
TIMER  T=0.5  ··· TIMER COMMAND
MOVL
MOVL
MOVL
ARCOF      ........... ··· WELDING END COMMAND
MOVJ
MOVJ
END
```

```
N O P
M O V J
W A I T   I N # 1 = 1    ··· INPUT WAITING COMMAND
M O V J
M O V L
A R C O N                ··· WELDING START COMMAND
M O V L
M O V L
M O V L
A R C O F                ··· WELDING END COMMAND
M O V J
M O V J
E N D
```

FIG. 24

ROBOT OPERATING PROGRAM SELECTION WINDOW

TEST-1: This program is used for performing an operation test of robot

TEST-2: This program is used for performing a test of robot. Made by Yaskara

OPERATION-1: WELD T joint corner

OPERATION-2: WELD FLARE GROOVE JOINT

OPERATION-3: Program for ARC ON, Manager Yamada

OPERATION-4: This program is not used now. However, DO NOT ERASE. Manager: Nishimura

BACK   NEXT PAGE

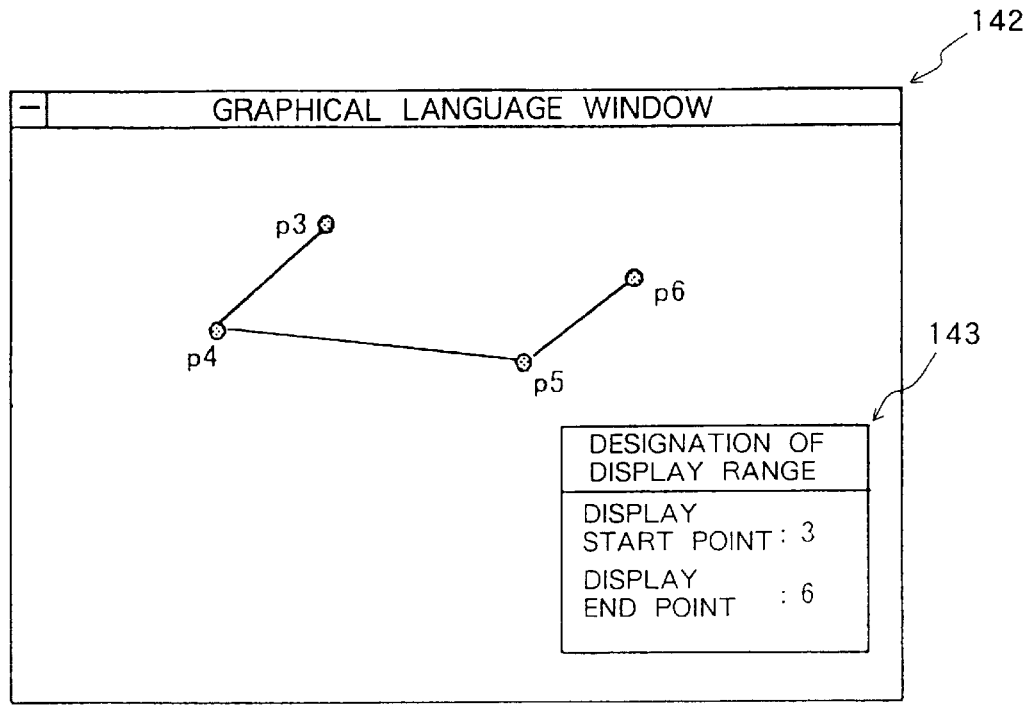

Fig. 27

```
            151
 ┌─────────────┐
 │ N O P       │
 │ M O V J     │ ········· POINT p1 MOTION COMMAND (JOINT OPERATION)
 │ M O V J     │ ········· POINT p2 MOTION COMMAND (JOINT OPERATION)
 │ M O V L     │ ········· POINT p3 MOTION COMMAND
 │             │           (LINEAR INTERPOLATION OPERATION)
 │ M O V C     │ ········· POINT p4 MOTION COMMAND
 │             │           (CIRCULAR INTERPOLATION OPERATION)
 │ M O V C     │ ········· POINT p5 MOTION COMMAND
 │             │           (CIRCULAR INTERPOLATION OPERATION)
 │ M O V C     │ ········· POINT p6 MOTION COMMAND
 │             │           (CIRCULAR INTERPOLATION OPERATION)
 │ M O V J     │ ········· POINT p7 MOTION COMMAND (JOINT OPERATION)
 │ M O V J     │ ········· POINT p8 MOTION COMMAND (JOINT OPERATION)
 │ E N D       │
 └─────────────┘
```

Fig. 28

```
                                    ┌─161
NOP
MOVJ    C0000    VJ=0.78
MOVJ    C0001    VJ=0.78
MOVL    C0002    V=11.0
MOVL    C0003    V=11.0
MOVL    C0004    V=11.0
MOVL    C0005    V=11.0
MOVL    C0006    V=11.0
MOVJ    C0007    VJ=0.78
END
```

```
              NOP
              'TSH:BEGIN
    STEP 1    MOVJ   C0000   VJ=10.00
              'TSH:POST
    STEP 2    MOVJ   C0001   VJ=10.00
              'PRE                         ;STEP 3 IS ASSOCIATED WITH AND
    STEP 3    MOVL   C0002   V=16.7         ADDED BEFORE STEP 4
    STEP 4    MOVL   C0003   V=16.7
              'ARCBEGIN:#0001
              ARCCUR  AC=203
              ARCVOL  AVP=83
              ARCON
              ARCCUR  AC=203
              ARCVOL  AVP=83
              'POST                        ;STEP 5 IS ASSOCIATED WITH AND
    STEP 5    MOVL   C0004   V=16.7         ADDED AFTER STEP 4
              'PRE                         ;STEP 6 IS ASSOCIATED WITH AND
    STEP 6    MOVL   C0005   V=16.7         ADDED BEFORE STEP 7
    STEP 7    MOVL   C0006   V=16.7
              'POST                        ;STEP 8 IS ASSOCIATED WITH AND
    STEP 8    MOVL   C0007   V=16.7         ADDED AFTER STEP 7
              'PRE                         ;STEP 9 IS ASSOCIATED WITH AND
    STEP 9    MOVL   C0008   V=16.7         ADDED BEFORE STEP 10
    STEP 10   MOVL   C0009   V=16.7
              'POST                        ;STEP 11 IS ASSOCIATED WITH AND
    STEP 11   MOVL   C0010   V=16.7         ADDED AFTER STEP 10
              'PRE                         ;STEP 12 IS ASSOCIATED WITH AND
    STEP 12   MOVL   C0011   V=16.7         ADDED BEFORE STEP 13
    STEP 13   MOVL   C0012   V=16.7
              ARCOF
              'ARCEND
    STEP 14   MOVL   C0013   V=16.7
    STEP 15   MOVJ   C0014   VJ=25.00
    END
```

Fig. 35

ROBOT LANGUAGE PROCESSING APPARATUS

TECHNICAL FIELD

The present invention relates to a robot language processing apparatus such as a program display apparatus, a teaching apparatus, and a programming pendant for use in teaching an industrial robot, and more particularly to a robot language processing apparatus for graphically displaying programming contents and easily editing a program and teaching a robot.

BACKGROUND ART

Industrial robots, particularly teaching-playback industrial robots having three or more degrees of freedom, are often instructed with a small-size user interface unit called a programming pendant or a teaching box which is connected to a robot controller. Alternatively, an application program is generated using a programming language for robot control, and a robot is operated according to the application program.

When an application program is to be generated off-line and a robot is to be operated according to the generated application program, it is difficult to accurately describe movement details based on actual workpiece configurations. Therefore, it is widely practiced to correct such an application program while actually moving the robot with a programming pendant or the like. Therefore, it is customary to describe rough movements with an application program and teach a robot with a programming pendant for detailed movements while actually moving the robot. For displaying the application program, the programming pendant is used as a program display because of the need to indicate the application program to the user in some way on correction of the application program.

A welding robot as a teaching-playback industrial robot will hereinafter be described by way of example. However, the present invention is by no means limited to a welding robot.

As shown in FIG. 1, a conventional program display apparatus for a teaching-playback industrial robot is typically constructed as a programming pendant 90. The programming pendant 90 has a display screen 91 generally referred to as a robot operation program display for displaying various information to the user, and a plurality of entry keys 94 for entering commands, numerical values, and directional information. The programming pendant 90 is connected to a robot controller by a cable 96 which includes signal lines and power lines, and also to another information entry unit 97 such as a pointing device. The programming pendant 90 is supplied with electric energy from the robot controller through the cable 96. The programming pendant 90 exchanges information with the robot controller, and is supplied with information from the entry keys 94 and the information entry unit 97. Based on the exchanged information, the programming pendant 90 displays a programming language on the display screen 91. In the illustrated example, the display screen 91 displays, on the basis of characters, four lines of the programming language ranging from "JOB-40" to "END".

Program languages for controlling industrial robots include compiler-type program languages and interpreter-type program languages. The compiler-type program languages are in the form of high-level languages, and compile a source program into an executable form which will be used to control actual robot operation. The interpreter-type robot languages are made up of a group of primitive commands. For controlling robot operation with an interpreter-type robot language, commands are entered from a programming pendant and at the same time operative positions of the robot are stored, and the commands are successively executed by an interpreter. When the user refers to and edits a robot language which is of either the compiler-type or the interpreter-type, an application program is displayed as a string of characters.

The conventional program display apparatus is problematic in that it is difficult for the user to grasp actual operation details of the robot because the operation details of the robot are displayed as a program list expressed by the robot language. Furthermore, since language expressions are made on the basis of characters, the operator for instructing the robot is required to understand commands defined by the robot language and their meanings when the teaching operator generates and edits a program using the program display apparatus or the programming pendant. However, unskilled operators find it difficult to master a group of commands of the robot language and needs a long period of time to learn those commands. In as much as operations peculiar to a robot cannot be represented by character-based expressions of the robot language, the operator cannot recognize whether motion commands for instructing the robot are correct and where specific commands are to be written in the description of control programs for peripheral devices, unless the actual robot is operated. When a generated operating program is to be confirmed, the operator cannot see what instruction is issued to a peripheral device in which position, unless the robot is actually operated.

For example, when a program for a welding robot is displayed on the basis of characters, and if the program includes an instruction indicative of an interval, in this document, "interval" is defined as an enclosed subset of instructions, e.g., start and end of a parallel shifting movement, and start and end of a welding process, then the start and the end of the interval can be understood only by looking for and recognizing start and end commands in a string of commands. When an interval is to be established, since either one of start and end commands can be entered, there is a possibility that a program with an uncompleted interval may be generated. For these reasons, for teaching the robot, the operator needs to generate a program and confirm operation of the robot by running the generated program concurrently with each other. Therefore, the process of teaching the robot has been time-consuming.

If a program is expressed on the basis of characters, then the operator cannot easily recognize movements of the robot by referring to the generated program, and often cannot see operation details defined by the program unless the program is actually executed by the robot controller.

In the present invention, apparatus having a user interface function and used for teaching an industrial robot, and apparatus for displaying and editing a program and converting taught details into an operating program will collectively be called a robot language processing apparatus. Specifically, the category of robot language processing apparatus include program display apparatus, programming pendants, teaching boxes, and teaching apparatus. However, since the teaching apparatus and the programming pendant generally have a program displaying function, and small hand-held ones of the teaching apparatus are called programming pendants, the classification of program display apparatus, programming pendants, and instructing apparatus is not of alternative nature.

A conventional teaching process using a program display apparatus or a programming pendant will be described in specific detail below.

Heretofore, the teaching process uses a programming pendant as a teaching apparatus, and a robot is operated with the programming pendant to teach the robot positions using commands and special terms according to a robot language. Thereafter, an experienced operator enters operation commands from the programming pendant as commands and special terms according to the robot language, based on the information which the operator has accumulated through experience.

This teaching process is disadvantageous in that it cannot easily be mastered by a novice because the robot language needs to be handled on the basis of characters and special terms also needs to be handled. To perform the operation process, it is necessary to teach the robot appropriate positions and orientations as a position teaching. However, if the operator is not sufficiently skilled, then the operator does not know appropriate positions and orientations, and fails to teach the robot positions. Even if appropriate positions and orientations are known for the operation process, it is difficult for the operator who is not accustomed to a robot operating process using axis operating keys on the programming pendant to manipulate the robot at will. Even if the operator has a feel about the relationship between axis key operations and robot operating directions, the operator frequently fails to know movement limits peculiar to the robot and a process of avoiding interference between the robot itself and a working tool. The operator tends to spend a lot of time to solve the above problem.

After the position teaching process is completed, a process of teaching the robot various conditions is not completed unless the operator knows what commands (e.g., welding current and voltage) should be given to peripheral devices at what times, and what operating speed of the robot is optimum. If speed settings exceed the maximum allowable speeds for the respective axes of the robot when the robot is actually operated after the position teaching process, then it is necessary to lower the speed settings. Since operating conditions that have already been established need to be adjusted when the speed settings are lowered, adjusting such operating conditions and speed settings is time-consuming. If the workpiece is of a complex and involves tilt and rotational angles, then the operator needs to be considerably skilled for teaching the robot various conditions, and it is difficult for the operator to select appropriate conditions.

As a result, it has heretofore been possible to teach a robot an operating program using a programming pendant only with the aid of an experienced operator who has both the skill of operating the robot and the skill of achieving desired operations. Lack of many such experienced operators and the difficulty in producing such experienced operators have been responsible for impeding widespread use of robots.

Several techniques for easily teaching a robot with a programming pendant have been proposed so far. For example, Japanese laid-open patent publication No. Hei 7-100645 discloses an arc welding robot apparatus which allows the operator to confirm welding conditions at the site of confirming operations which the robot has been taught, and which also allows the operator to visually read weighted means and estimate welding stability from a range of variations. The disclosed arc welding robot displays a welding current and a welding voltage in a real-time fashion on a teaching pendant. With the welding current and voltage being displayed in an analog representation, rather than a digital representation, the operator can confirm all operations with the teaching pendant, and is subject to a reduced working burden. Specifically, the disclosed arc welding robot has a robot itself, a teaching pendant for entering operation information for the robot, and an arc welding machine connected to the robot, the teaching pendant having a display unit for displaying actual welding conditions which include at least a welding current. This publication also reveals that at least one of the actual welding conditions is displayed in an analog representation on the teaching pendant. However, inasmuch as the teaching pendant only displays the welding current and voltage in an analog representation, the arc welding robot belongs to a category-which is capable of simply displaying numerical values.

Japanese laid-open patent publication No. Hei 4-322305 discloses a display apparatus for displaying operated positions of a robot without moving the robot directly to teaching positions. The display apparatus has a small-size transmitter for transmitting a radio-wave signal or a sound-wave signal, a plurality of receivers whose positions are fixed, and a processing unit. Using data indicative of time differences between received signals, the processing unit calculates the position of the transmitter, and teaches the calculated position as an operated position. The publication also discloses a display apparatus having two transmission units in a transmitter. Since the display apparatus calculates the position of the robot from the time differences between received signals with the processing unit, however, the display apparatus cannot display a welding path and its welding conditions as a graphical diagram for an easy understanding.

DISCLOSURE OF THE INVENTION

It is a first object of the present invention to provide a robot language processing apparatus which displays language expressions and an editing process of a robot language, that have conventionally been displayed on the basis of characters, in a graphical representation for allowing the operator to easily recognize teaching details, and which allows even a novice to program a robot and teach the robot an operating program.

A second object of the present invention is to provide a programming pendant for a teaching-playback industrial robot having three or more degrees of freedom, the programming pendant being capable of expressing details of a generated robot program as pictures for allowing the user to generate, correct, and confirm operation details with ease.

The first object of the present invention can be achieved by a robot language processing apparatus for displaying a robot program which has been already taught, comprising display means for graphically displaying a picture and capable of designating a position in the displayed picture with pointing means, storage means for storing the robot program, and processing means for displaying an operation interval and an air-cut interval as successive lines on the display means by referring to the robot program, and controlling the display means to display the type of an operation detail at either one of the lines when the either one of the displayed lines is designated by the pointing means, especially upon teaching.

The first object of the present invention can be achieved by a robot language processing apparatus for describing operation details of a teaching-playback robot and teaching the robot, comprising display means for graphically displaying a picture and capable of designating a position in the displayed picture with pointing means, storage means for storing the robot program as intermediate codes, and language processing means for decoding the intermediate codes and connecting orthogonal space positions of a group of motion commands stored in a time-series manner with straight lines or curved lines, converting an obtained group of lines into coordinates in the displayed picture as viewed from an arbitrary viewpoint, graphically displaying the converted group of lines on the display means, and displaying time-series numbers of points in the group of motion commands in superimposed relation to the group of lines on the display means.

The second object of the present invention can be achieved by a programming pendant for teaching an industrial robot having at least three degrees of freedom, comprising display means for graphically displaying a picture and capable of designating a position in the displayed picture with pointing means, storage means for storing an operating program which contains target positional data for the robot described as motion commands, a database storing operating conditions, and language processing means for three-dimensionally graphically displaying a taught path on the display means, displaying a group of icons representing physical operating conditions when a straight line or a curved line interconnecting two arbitrary motion commands in the displayed path is designated by the pointing means, searching the database to read a group of operating conditions derived from a first group of physical operation conditions determined on the basis of robot position and icons which are designated by pointing means, and a second group of physical operation conditions determined in advance with respect to a system which includes the robot, converting the resulting group of operating conditions into an operating command for the robot, and automatically incorporating the operating command into the designated position in the operating program.

In the present invention, the pointing means may comprise a mouse, an entry pen, or a track ball. In particular, if a transparent tablet placed on the display screen of a display device is used as the display means, then an entry pen or a stylus is the preferred pointing means. If the display means is in the form of a touch panel, then a finger of the operator serves as the pointing means.

In the present invention, the display means may comprise a CRT, a liquid crystal display panel, or a plasma display panel. The display means should preferably allow the pointing means such as a pen to touch the display screen for directly designating a position on the display screen. If a mouse or a track ball is used as the pointing device, then the position where the operator operates the pointing device to designate a position and the display screen are physically spaced apart from each other. Therefore, the operation efficiency of a mouse or a track ball is poorer than devices which can directly designate a position on the display screen, from the standpoint of a teaching process that is carried out at a site where the robot is installed.

BRIEF DESCRIPTION OF THE DRAWINGS

FIG. 7 is a diagram showing an example of a robot operating program with motion commands already taught;

FIG. 8 is a view of a displayed picture of the group of motion commands presented in a graphical representation in association with the robot operating program shown in FIG. 7;

FIG. 13 is a diagram showing an example of a robot operating program after welding conditions are established in the second embodiment;

FIG. 14 is a view of an example of a displayed picture for displaying and editing setting details in the second embodiment;

FIG. 24 is a view of an example of an operating program selection window showing operating programs with corresponding symbols;

FIG. 27 is a view of a displayed picture of a group of motion commands presented in a graphical representation within a designated interval;

FIG. 28 is a diagram showing an example of a robot operating program with motion commands already taught according to a fourth embodiment of the present invention;

FIG. 35 is a diagram showing an example of an operating program which is automatically generated when teaching is performed for the robot operating program shown in FIG. 34.

BEST MODE FOR CARRYING OUT THE INVENTION

Figure 1:
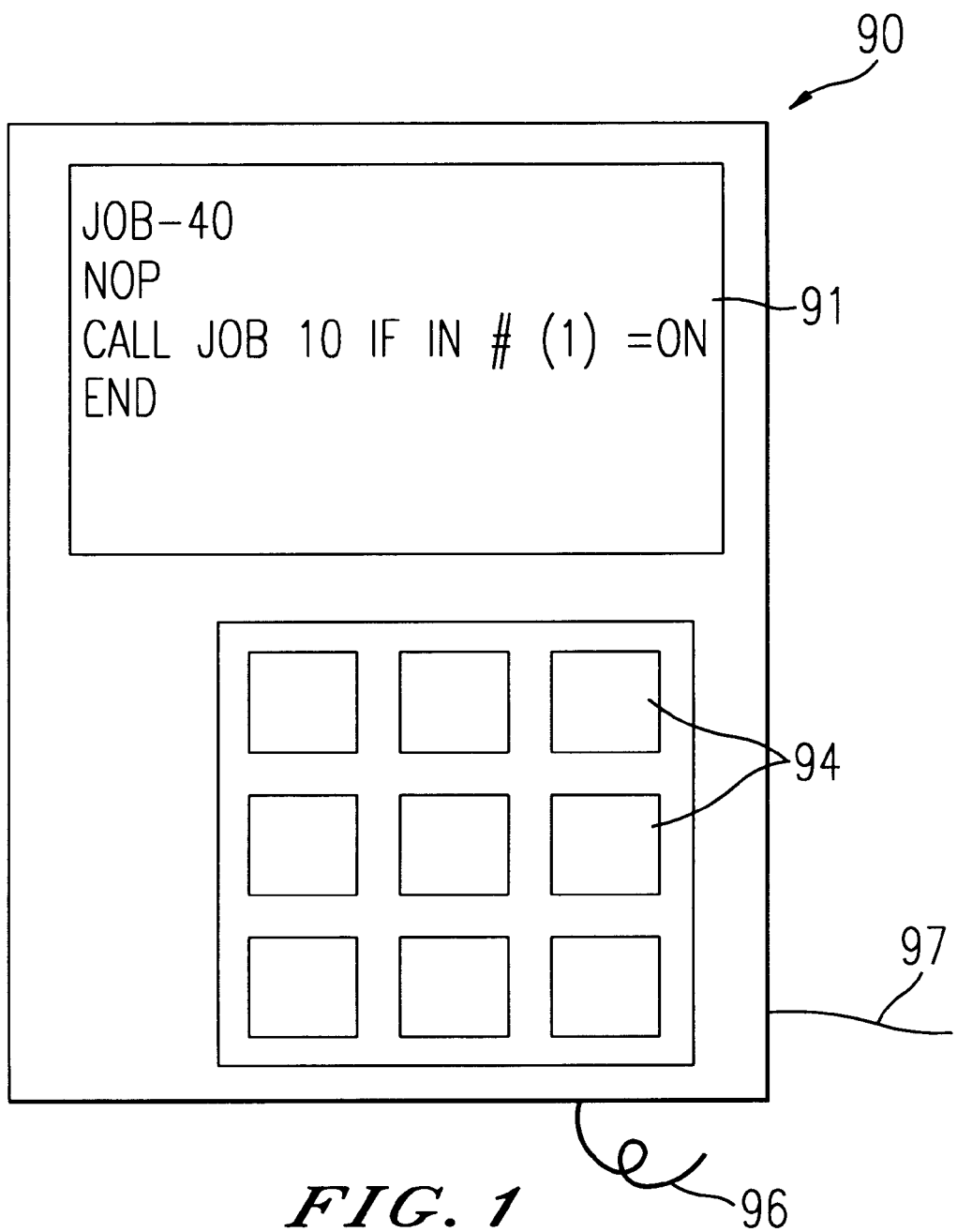
FIG. 1 is a schematic view of a conventional program display apparatus.

Preferred embodiments of the present invention will be described below with reference to the drawings. Like or corresponding reference numerals denote like or corresponding parts throughout drawings.

First Embodiment

Figure 2:
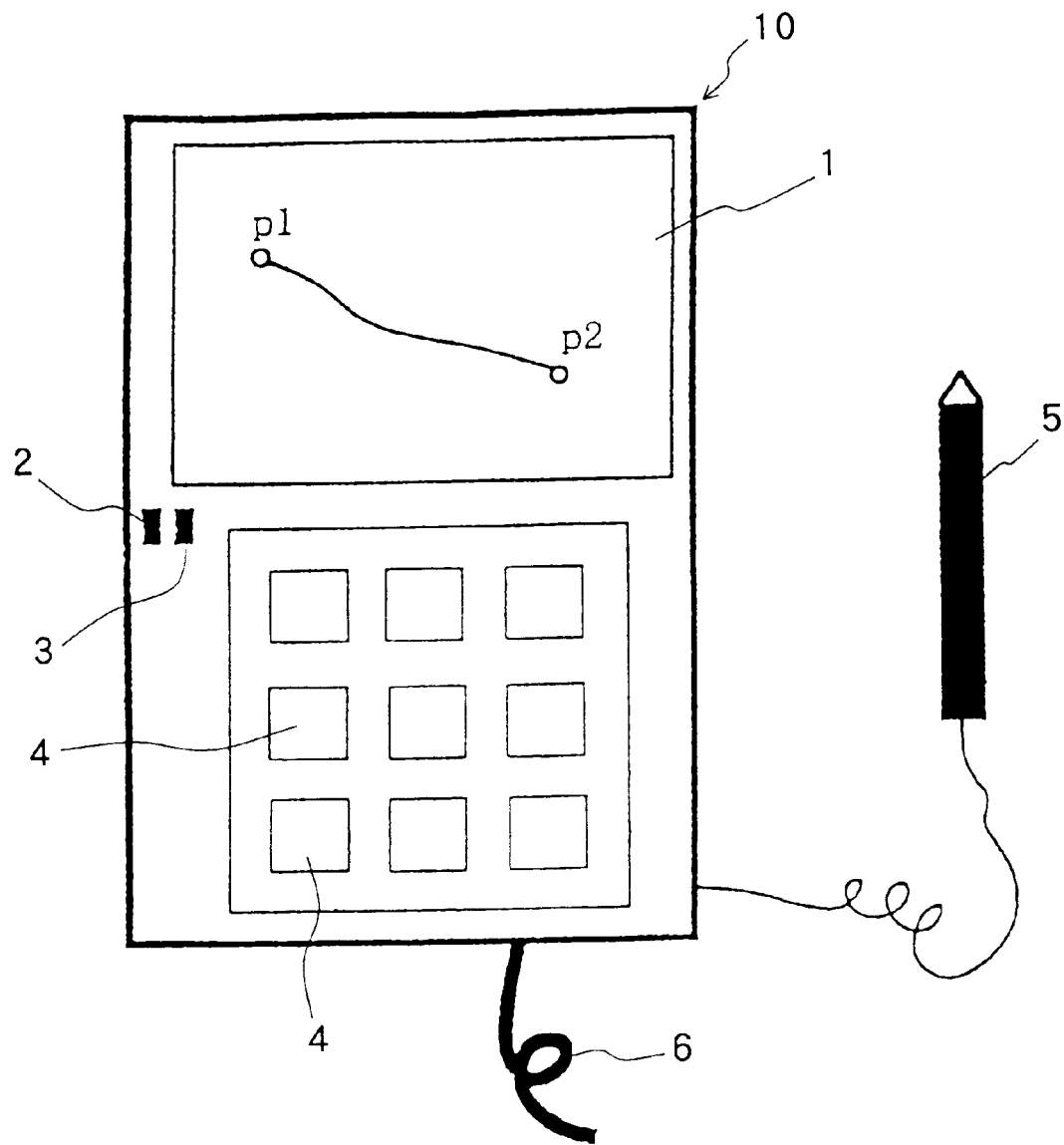
FIG. 2 is a schematic view of a programming pendant according to a first embodiment of the present invention.

Principles of the present invention will first be described below as a first embodiment of the present invention. FIG. 2 shows a programming pendant 10 according to a first embodiment of the present invention, as a robot language processing apparatus for displaying a robot program based on the principles of the present invention. The programming pendant 10 is used in a process of teaching a robot. The programming pendant 10 comprises a display screen 1 capable of displaying a robot operating program image in a graphical representation as a robot operating program image, a selector button 2, a welding speed button 3, a number of entry keys 4 for entering commands, etc., and an entry pen 5 as a pointing device. The programming pendant 10 is connected to a robot controller by a cable 6 which includes signal lines and power lines, so that the programming pendant 10 can be supplied with electric energy from the robot controller, and can transmit necessary information to and receive necessary information from the robot controller. When an arbitrary position on the display screen 1 is clicked by the entry pen 5, the clicked position (coordinates) on the display screen 1 is entered into the programming pendant 10. This function is the same as a mechanism for entering positions and commands through a pointing device such as a mouse based on a graphical user interface (GUI) in an information processing system such as a personal computer, a workstation, or the like. However, in view of the usage of the programming pendant 10 as a programming pendant for an industrial robot, the entry pen 5 is used as a pointing device.

The present invention assumes a teaching-playback industrial robot having three or more degrees of freedom as the robot. As an example of such an industrial robot, an arc welding robot will be described below. However, the present invention is also applicable to robots other than welding robots.

Figure 3A:
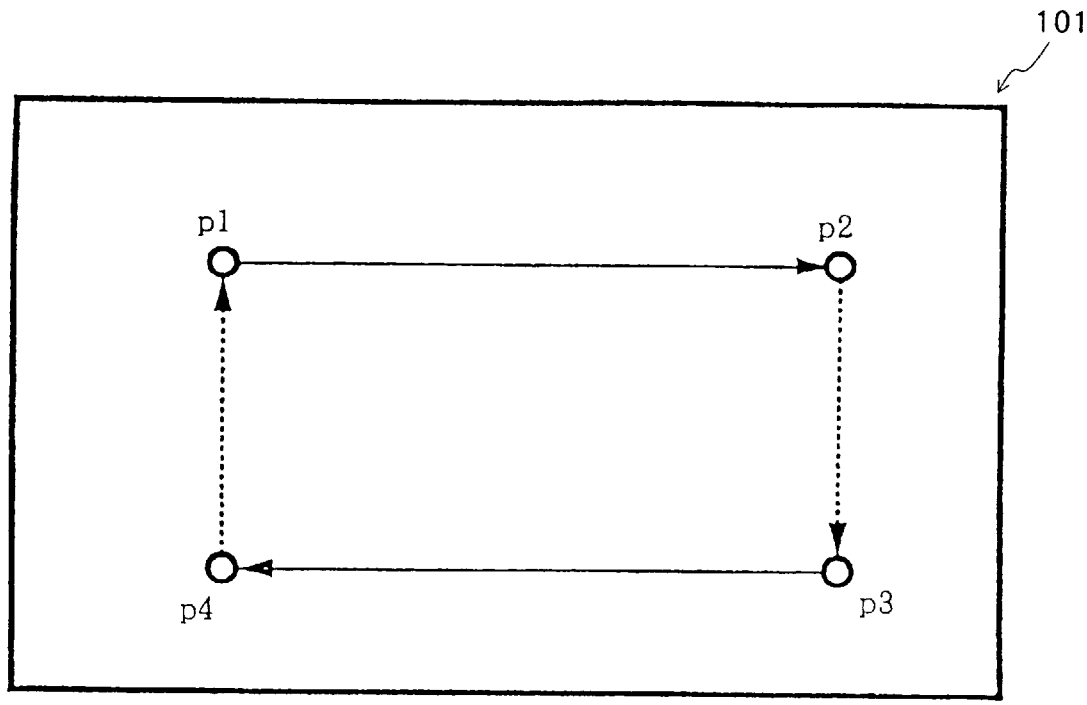
FIG. 3a is a view showing an example of a picture displayed as a welding operation interval identification window in the first embodiment.
Figure 3B:
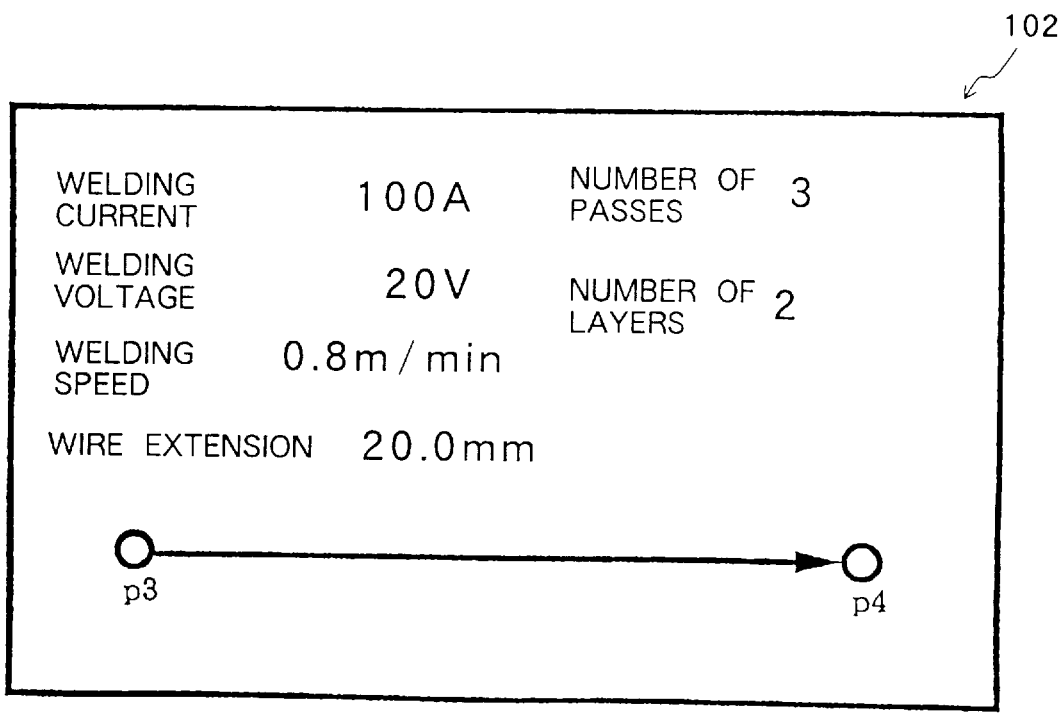
FIG. 3b is a view showing another example of a picture displayed as a welding operation interval identification window in the first embodiment.

FIGS. 3a and 3b show examples of pictures displayed on the display screen 1. The pictures are displayed as welding operation interval identification windows. Specifically, FIG. 3a shows a displayed picture 101 of program details presented in a graphical representation, and FIG. 3b shows a displayed picture 102 further including some welding conditions as constants. FIG. 3a shows a welding operation interval identification window for a set of intervals, and FIG. 3b shows another welding operation interval identification window with welding operation details for one of the intervals.

The selector button 2 is positioned in an upper left portion of an area which contains the entry keys 4 and the buttons 2, 3, and is used to select teaching details displayed in a program language (on the basis of characters) on the display screen 1 as shown in FIG. 1 or teaching details displayed in a graphical representation on the display screen 1 as shown in FIG. 3a. Each time the selector button 2 is pressed, the displayed picture switches between a character display mode and a graphical display mode. For confirming teaching details, the user presses the selector button 2 to switch to the graphical display mode. When the displayed picture switches to graphical display mode, the display screen 1 displays thereon an welding operation in welding intervals (solid lines) p1→p2, p3→p4 and air-cut intervals (dotted lines) p2→p3, p4→p1, and adds numbers p1, p2, p3, p4 to points in the order in which to weld a workpiece.

For viewing operation information in detail in each of the intervals, the user clicks a welding operation interval (e.g., p3→p4), which the user wants to view in detail, on the display screen 1 with the entry pen 5 for thereby designating the welding operation interval. Normal welding lines and weaving welding lines are distinguished from each other by colors or displayed line types.

A welding speed can be selected when the welding speed button 3 positioned next to the selector button 2 is pressed. When the welding speed button 3 is pressed, a bright spot corresponding to a welding spot is displayed on the display screen 1, and moves on a displayed welding line based on an actual welding speed. Specific numerical values of a welding voltage, a welding current, a wire extension, the number of passes, and the number of layers are displayed above the welding line that is being designated, as shown in FIG. 3b.

According to the present invention, as can be seen from the above embodiment illustrated as the principles of the invention, the mode for displaying a program on the basis of characters and the mode for displaying a program in a graphical representation are switched over for the user to visually confirm operation details with respect to the program.

Second Embodiment

Figure 4:
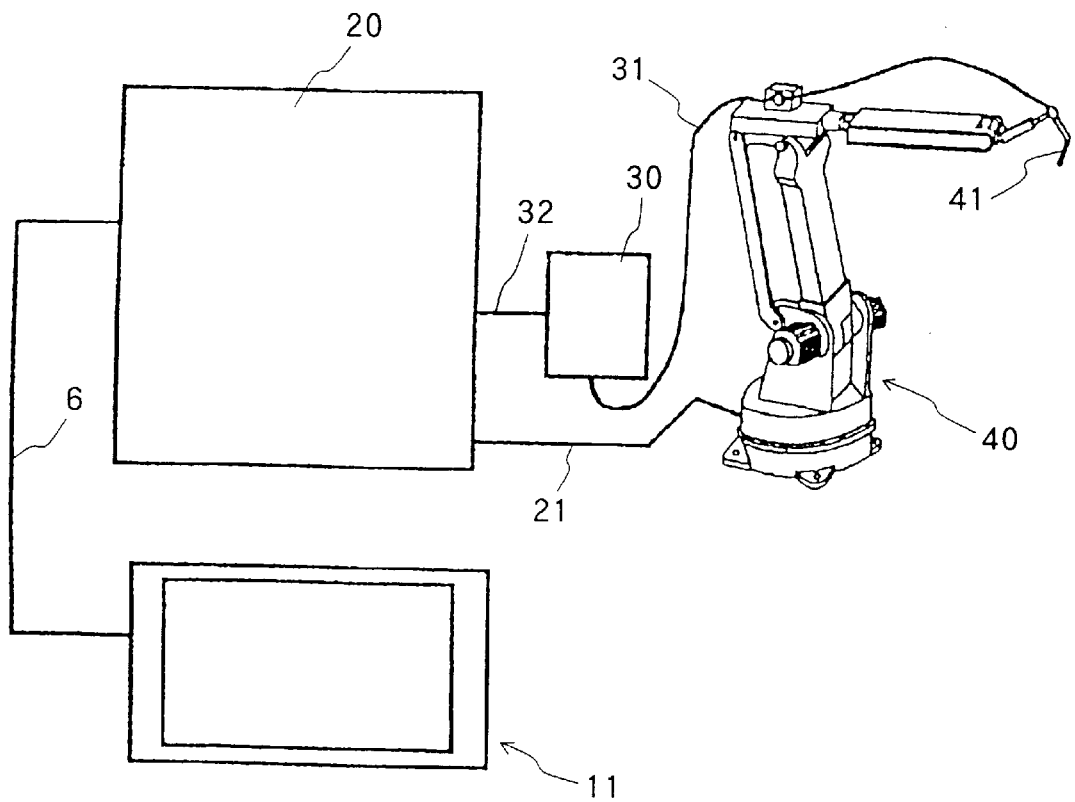
FIG. 4 is a block diagram of a welding robot system according to a second embodiment of the present invention.

An embodiment arranged as an environment for teaching an actual welding operating program will be described below. A welding robot system shown in FIG. 4 comprises a robot 40 having a welding torch 41 mounted as an operating tool on the tip end of an arm, a welding machine 30 for supplying welding electric energy through a welding power line 31 to the welding torch 41, a controller 20 for controlling the welding machine 30 and the robot 40, and a programming pendant 11 for displaying a robot program and teaching the robot 40. The controller 20 and the welding machine 30 are connected to each other by a welding machine control line 32, and the controller 20 and the robot 40 are connected to each other by a robot control line 21. The programming pendant 11 and the controller 20 are connected to each other by a cable 6 for serial data transmission. Actually, the cable 6 has a power line for supplying electric energy from the controller 20 to the programming pendant 11 and a signal line for serially transmitting data.

Figure 5:
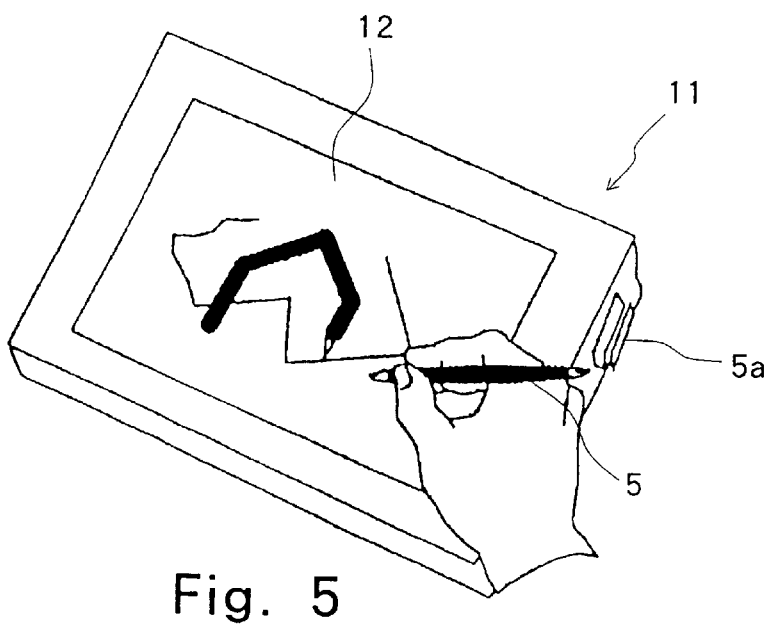
FIG. 5 is a schematic perspective view of a programming pendant used in the second embodiment.
Figure 6:
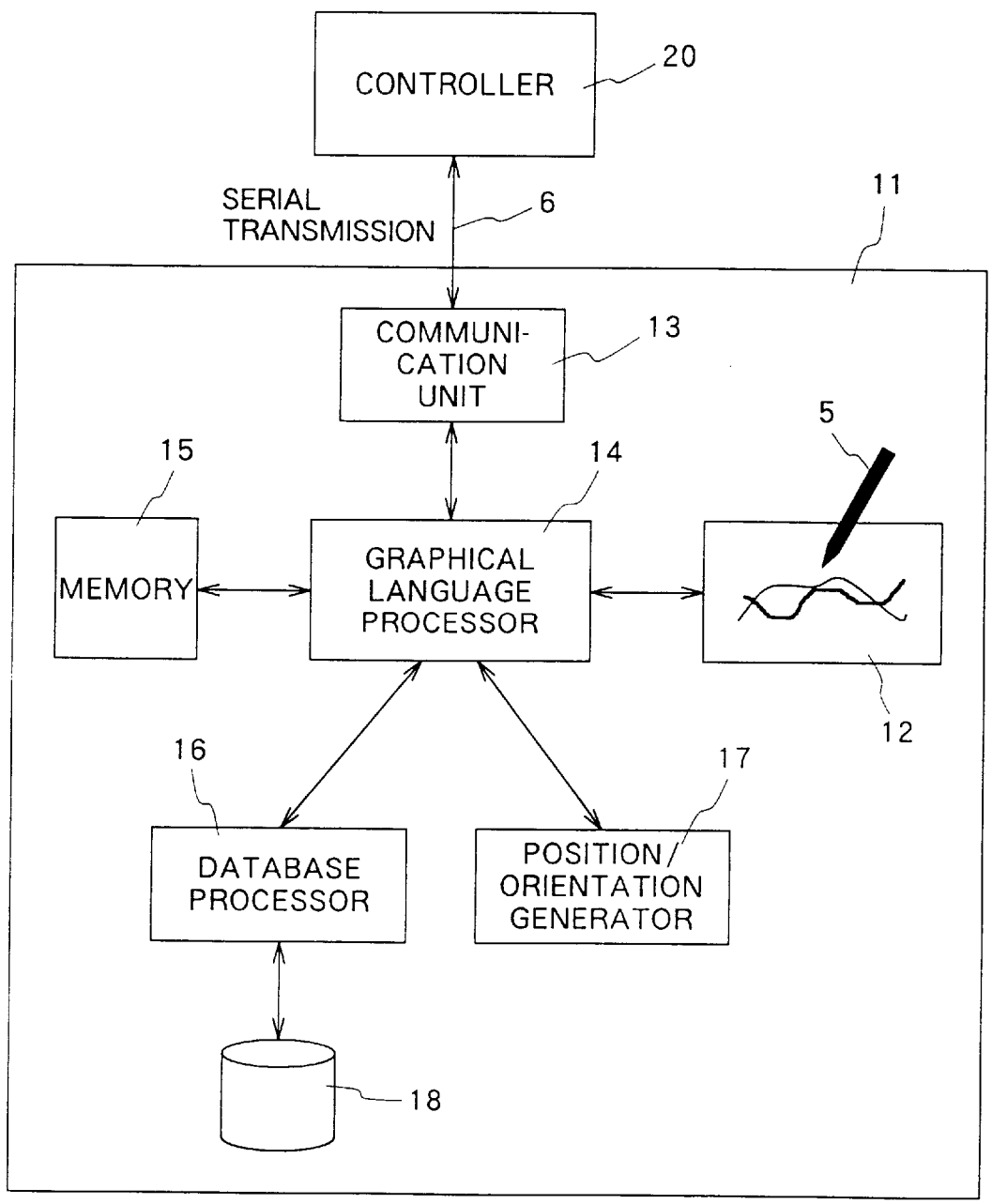
FIG. 6 is a block diagram of an internal arrangement of the programming pendant shown in FIG. 5.

The programming pendant 11 has an appearance shown in FIG. 5, and an internal arrangement shown in FIG. 6. The programming pendant 11 functions as a robot language processing apparatus.

The programming pendant 11 differs from the programming pendant 10 shown in FIG. 2 in that it does not have physical entry keys and buttons, and has a display screen 12 which extends entirely over the upper surface of the programming pendant. The programming pendant 11 employs so-called soft keys and soft buttons such that while icons representing keys and buttons are being displayed on the display screen 12, when one of the icons is pointed by an entry pen 5, the corresponding key or button is regarded as being pressed. The display screen comprises a transparent tablet disposed on a liquid display panel. The display screen is of a general structure employed in so-called personal digital assistants (PDA), and can readily be understood by those skilled in the art. A holder 5a for holding the entry pen 5 is mounted on a side of the programming pendant 11.

The programming pendant 11 has therein a communication unit 13 for effective communications between the programming pendant 11 and the controller 20, a graphical language processor 14 for controlling the display on the display screen 12 and the editing of a program, a memory 15 for storing a program represented by intermediate codes and temporary data, a database processor 16, a position/orientation generator 17 for generating a position and an orientation of the robot, and a welding condition database 18 which stores various welding conditions. The graphical language processor 14 also controls overall operation of the programming pendant 11, and transmits data to and receives data from the communication unit 13, the display screen 12, the memory 15, the database processor 16, and the position/orientation generator 17. The database processor 16 serves to search the welding condition database 18 and effect other database processing operations based on commands from the graphical language processor 14.

While the internal structure of the programming pendant 11 is described above, the programming pendant 11 may actually be implemented by a computer, plus software which is run by the computer. Specifically, the graphical language processor 14, the database processor 16, and the position/orientation generator 17 can be implemented by software on a computer, and a portion of the communication unit 13 which is related to communication control can also be implemented by software. In particular, the graphical language processor 14 functions as an operating system (OS), and operates as a graphical user interface (GUI) for displaying information in a multi-window manner on the display screen 12.

The system according to the present embodiment will be described below by describing operations carried out by the operators and changes in displayed details on the programming pendant 11. A process of referring to and editing an operating program with motion commands already taught, using the programming pendant 11, for completing a welding operating program will be described below. FIG. 7 shows an example of an operating program 102 with motion commands already taught. The operating program is displayed on the basis of characters according to a conventional representation process. In FIG. 7, notes added to the right of dotted lines are remarks relative to commands in respective lines. "NOP" represents a no-operation command for executing nothing, "MOVJ" a motion command in a joint operation, "MOVL" a motion command in a linear interpolation operation, and "END" a command indicative of the end of the program.

The programming pendant 11 can display the program selectively in a character display mode and a graphical display mode. First, a basic teaching path and displayed forms of the torch and the robot in the graphical display mode will be described below.

A group of motion commands which have been taught are displayed as a three-dimensional path as viewed from an arbitrary viewpoint by the graphical language processor 14. FIG. 8 shows a displayed picture 104. The displayed picture 104 contains "GRAPHICAL LANGUAGE WINDOW" displayed in a bar at the top of the display, indicating that the group of motion commands are displayed in one display window in a multi-window display. Joint motion intervals, i.e., intervals of a mode in which the axes operate simultaneously without interpolation control between points, are displayed in broken lines, and intervals in which the axes operate with linear and circular interpolation are displayed in solid lines. Teaching positions in the group of the motion commands are indicated by circular dots, and numbers allotted in a time series to these teaching positions are displayed near the corresponding teaching positions. In the illustrated example, the numbers p1→p8 are displayed. In the joint motion intervals, the path of the tip end of the welding torch that is actually operated is displayed.

Figures 9, 10:
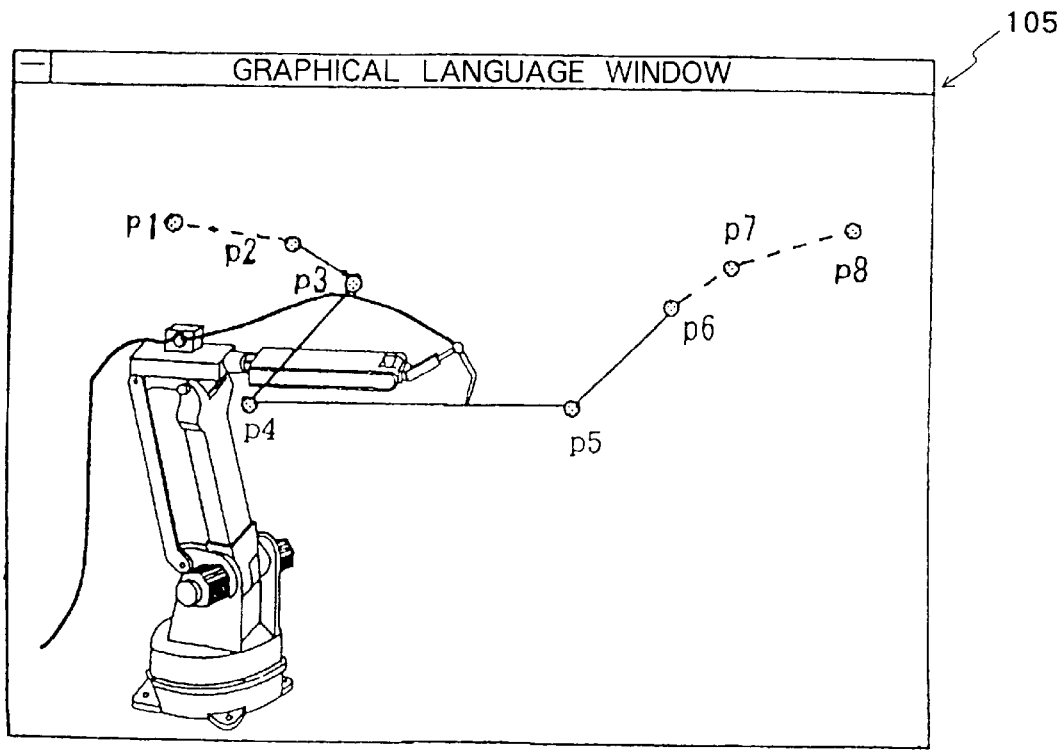
FIG. 9 is a view of a displayed picture in a mode for displaying a robot and a torch.
FIG. 10 is a diagram showing an example of a robot operating program after a welding interval is established in the second embodiment.

FIG. 9 shows the robot and the torch that are displayed in a display mode. If the group of motion commands are graphically displayed as shown in FIG. 8, then when a number indicative of a teaching position in the displayed image is entered by clicking with the entry pen 5, a picture 105 shown in FIG. 9 is displayed. In the displayed picture 105, surface models of the torch 41 and the robot 40 are superimposed onto the group of motion commands displayed in solid and dotted lines. A display mode switch as a soft switch may be displayed at a corner of the display screen 12, and may be operated by the entry pen 5 to switch between displayed and non-displayed states of the surface models of the robot and the torch.

After the welding robot has been taught positions, the welding robot has to be taught welding intervals. Designating welding intervals with the programming pendant 11 will be described below.

While the graphical display is being shown as illustrated in FIG. 8, the operator designates a welding interval on the displayed image with the entry pen 5. If, for example, a welding start interval is p3–p4 and a welding end interval is p5–p6, then the operator clicks the line from the point p3 to the point p4 and the line from the point p5 to the point p6 with the entry pen 5, thereby indicating a welding interval. The graphical language processor 14 adds a welding start command immediately after a motion command toward the point p2 and a welding end command immediately after a motion command toward the point p6, to the operating program which is stored as intermediate code in the memory 15. At the same time, the graphical language processor 14 changes the color of the lines between the points p2 and p6 from black (non-welding interval) to red (welding interval) in the picture. FIG. 10 shows a robot operating program 106 generated after such a welding interval is designated in the operating program shown in FIG. 7.

Figures 11, 12:
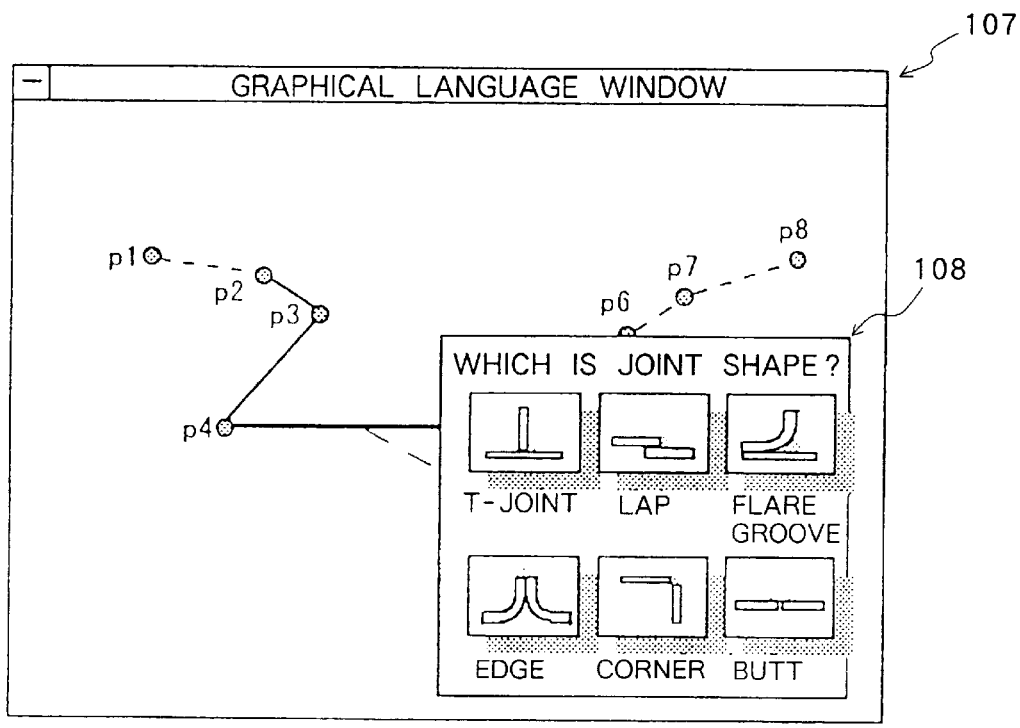
FIG. 11 is a view of an. example of a displayed picture for establishing physical welding conditions in the second embodiment.
FIG. 12 is a diagram showing an example of a robot operating program after the physical welding conditions are established in the second embodiment.

Establishing physical welding conditions will be described below. FIG. 11 shows a displayed picture 107 for establishing physical welding conditions. The displayed picture 107 is similar to the displayed picture 104 shown in FIG. 8, but differs therefrom in that a floating window 108 for selecting physical welding conditions is displayed.

The operator operates a soft key on the display screen 12 to start establishing physical welding conditions. Thereafter, the operator designates an interval in which physical welding conditions are to be established, with the entry pen 5, in the same manner as when the welding interval is established. As a result, the floating window 108 is displayed. The floating window 108 displays therein joint shapes, workpiece thicknesses, and workpiece materials as icons or characters. The operator selects desired items and clicks the selected items with the entry pen 5 for establishing physical welding conditions. The graphical language processor 14 adds the established details as internal control code (internal code) immediately after the welding start command to the operating program stored in the memory 15. FIG. 12 shows a robot working program 108 with the established physical welding conditions. In the illustrated example, a lap joint is as the joint shape, and 3.2 mm is established as the workpiece thickness.

The teaching operation is basically complete when the above procedure has been carried out. Since optimum welding conditions are not yet established, the operating program is automatically optimized at this stage.

When a soft key on the display screen 12 is operated to indicate a process of automatically optimizing the operating program, the graphical language processor 14 reads a group of data as internal control codes from the operating program, and the database processor 16 searches the welding condition database 18 and reads a group of operating conditions including a welding current, a welding voltage, a welding speed, and a welding torch orientation, etc. The graphical language processor 14 converts the welding current, the welding voltage, and the welding speed into operating commands for the robot, and automatically adds the operating commands to the operating program at appropriate positions therein. A robot operating program 109 generated after the operating program is automatically optimized is shown in FIG. 13.

The operating program is automatically optimized according to the above process. Though the optimization of only the welding conditions is described above, various optimizing processes for automatically modifying orientations, automatically adding orientation changing points, optimizing positions with operation limits and interference avoidance, confirming and automatically correcting operating speeds, and re-changing welding conditions are actually carried out in addition to the optimization of the welding conditions.

After the automatic optimization of the operating program is finished, the setting details of the automatic optimization are confirmed. The programming pendant 11 according to this embodiment displays a window for displaying and editing setting details when the operator designates, with the entry pen 5, the line of a welding interval in the displayed picture in the graphical display mode, and allows the operator to adjust the setting details in the displayed window for displaying and editing setting details. FIG. 14 shows a displayed window 110 for displaying and editing setting details. The displayed window 110 for displaying and editing setting details is similar to the displayed picture 104 shown in FIG. 8, but differs therefrom in that a floating window 111 for displaying welding conditions at the designated line is open. The floating window 111 displays therein a joint shape as an icon, and a workpiece thickness, a welding current, a welding voltage, and a welding speed as numerical values. The setting details of the welding current, the welding voltage, and the welding speed can adjusted with fine adjustment buttons 112 positioned laterally of the display areas thereof. When the fine adjustment buttons 112 are operated with the entry pen 5, the numerical values are incremented or decremented, and the incremented or decremented numerical values are established.

The teaching process for the operating program with positions already taught has been described above. There is an occasion in which the operator may adjust a position or an orientation which has already been taught. A process of adjusting a position or an orientation will be described below.

Figures 15, 16:
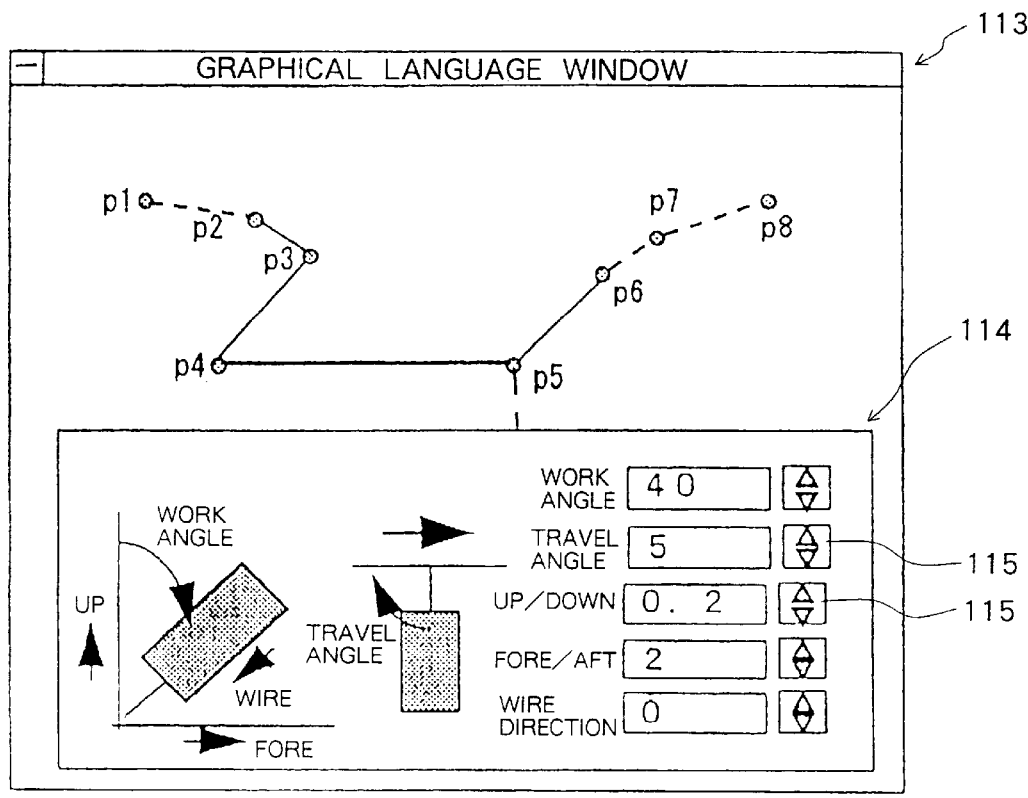
FIG. 15 is a view of an example of a displayed picture for modifying positions and orientations in the second embodiment.
FIG. 16 is a diagram showing an example of a robot operating program which contains a timer waiting command.

For correcting position/orientation data of a motion command, the operator operates a correction mode switch displayed as a soft switch on the display screen 12 with the entry pen 5 thereby to switch the programming pendant 11 to correction mode. The operator then designates a displayed number corresponding to a motion command on the display screen 12 with the entry pen 5 to determine a range in which positions and orientations are to be corrected. FIG. 15 shows a displayed window 113 for changing positions and orientations. The displayed window 113 for changing is similar to the displayed picture 104 shown in FIG. 8, but differs therefrom in that a floating window 114 for modifying positions and orientations are open. The floating window 114 is displayed so that positions and orientations are to be corrected. In the floating window 114, a present teaching position is graphically displayed three-dimensionally in coordinates of a workpiece or coordinates from the robot origin, and modification switches for successively modifying positions and orientations are also displayed. In the illustrated example, work and travel angles of the torch, vertical and fore-and-aft offsets of the welding position, and a torch extension (wire direction) can be adjusted. Their present numerical values are displayed, and can be adjusted by fine adjustment buttons 115 positioned to the side of the display areas. When the fine adjustment buttons 115 for desired items are operated with the entry pen 5, the numerical values are incremented or decremented, and the new values are established, thus modifying the position and orientation that has been taught. When the operator clicks an execute button displayed on the display window 12 to complete the position/orientation correcting process, the correction results are reflected in the position and orientation data of the designated motion command in the intermediate codes stored in the memory 15. When the fine adjustment buttons 115 are operated, the graphical representations of position and orientation in the displayed window 114 are simultaneously updated. Therefore, the operator can modify the settings with ease.

The relationship between operations made by the operator and displayed pictures with respect to the welding robot has been described in relation to basic operations. The programming pendant 11 according to this embodiment is also capable of teaching operation details other than the types described above. Teaching processes with respect to a timer waiting command, an input waiting command, and a conditional branch command will be described below.

Figure 17:
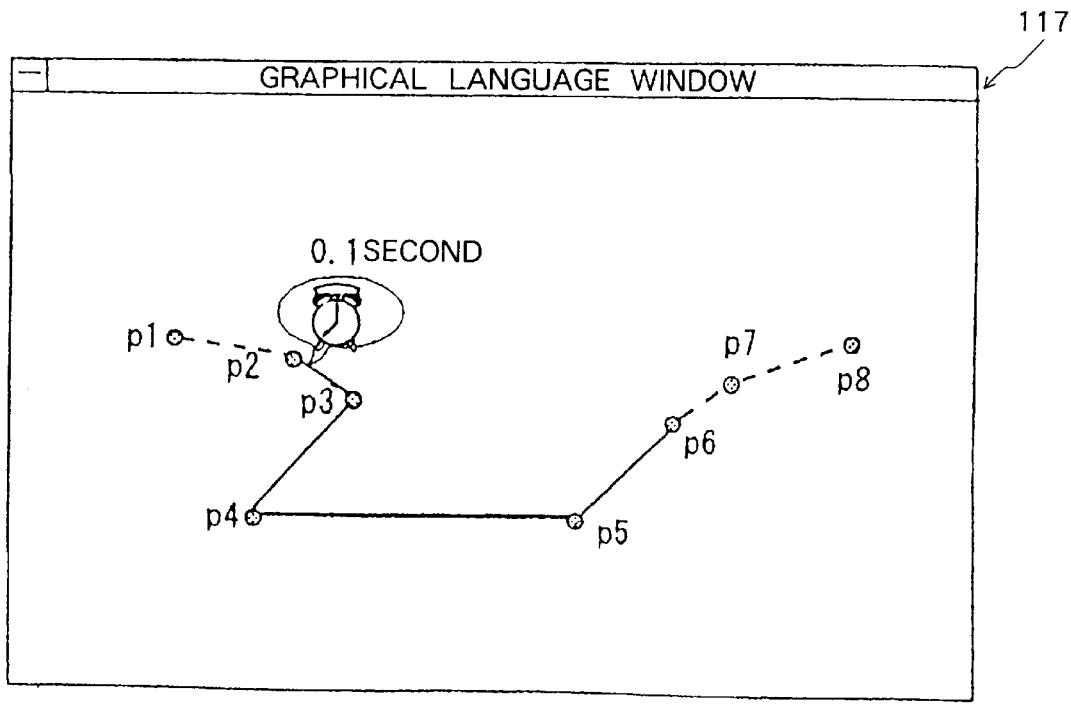
FIG. 17 is a view of an example of a displayed picture in which the timer waiting command is displayed as an icon.

First, a teaching process with respect to a timer waiting command will be described. FIG. 16 shows a robot operating program 116 which contains a timer waiting command. The robot operating program 116 is the same as the robot operating program 106 shown in FIG. 10, with a timer waiting command added immediately after the ARCON command. Based on the robot operating program 116, the display screen 12 displays thereon a picture 117 shown in FIG. 17. The displayed picture 112 is the same as the displayed screen 104 shown in FIG. 8, with a clock-shaped icon positioned near the teaching position p2. The clock-shaped icon indicates that a timer waiting command is present at its position. The clock-shaped icon is accompanied by a numerical value which represents a waiting time in seconds.

An operation teaching procedure for adding a timer waiting command will be described below.

Figure 18A:
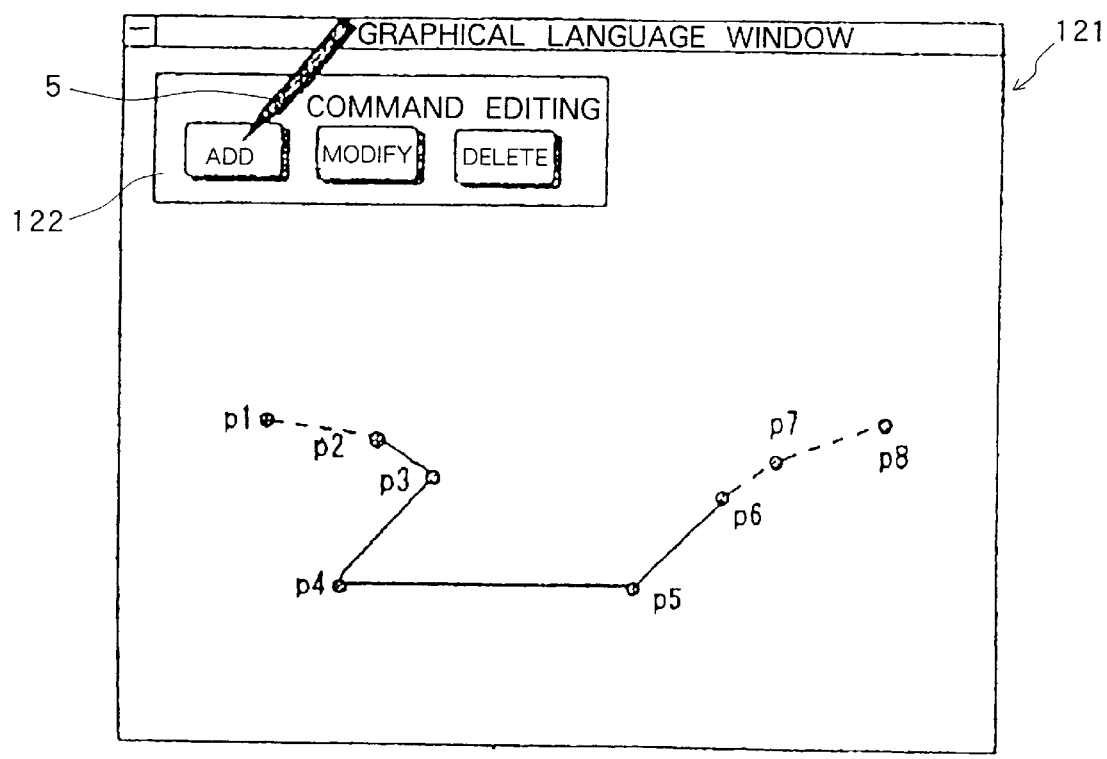
FIG. 18a is a view of an example of a command editing window.

When the operator clicks a command adding button displayed as a soft button on the display screen 12 with the entry pen 5, the programming pendant 11 is brought into a command adding mode in which a command editing window 121 shown in FIG. 18a is displayed. The command editing window 121 is the same as the displayed picture 104 shown in FIG. 8 with a command editing subwindow 122 added thereto. The subwindow 122 includes soft buttons for "ADD", "MODIFY", and "DELETE". A desired editing process can be performed when either one of the soft buttons is selected via the entry pen 5. Since a command is to be added, the operator clicks the button "ADD", and indicates the number of a position where the command is to be added.

Figure 18B:
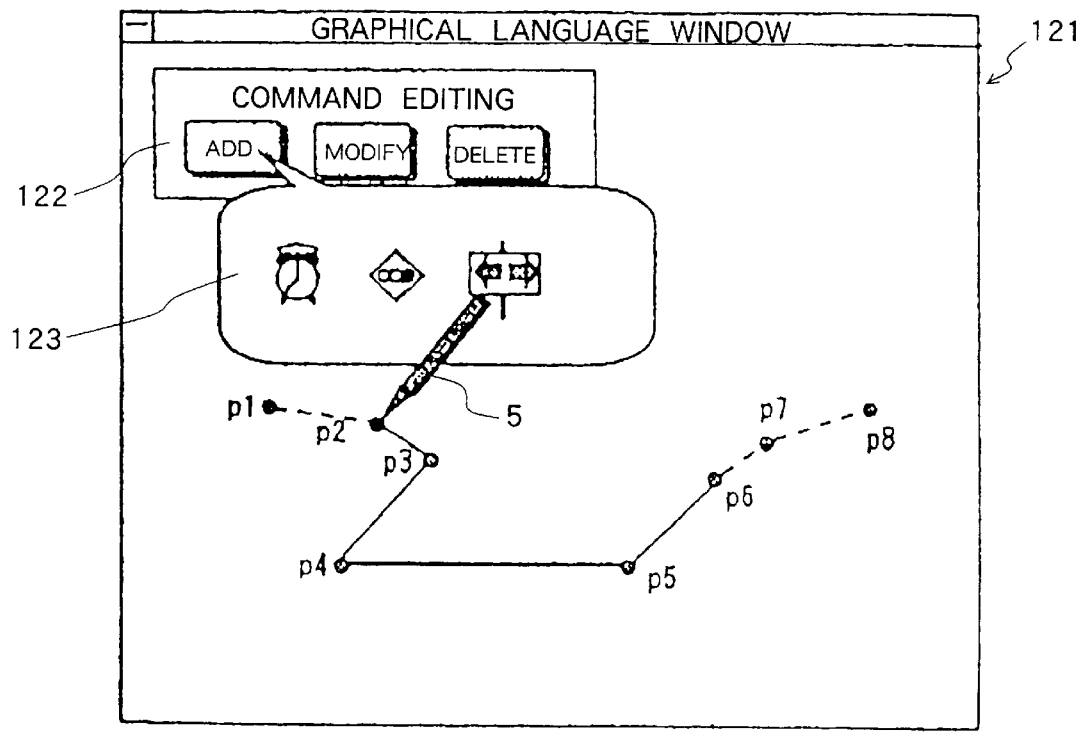
FIG. 18b is a view of a picture showing that a position where a command is to be added is indicated.
Figure 18C:
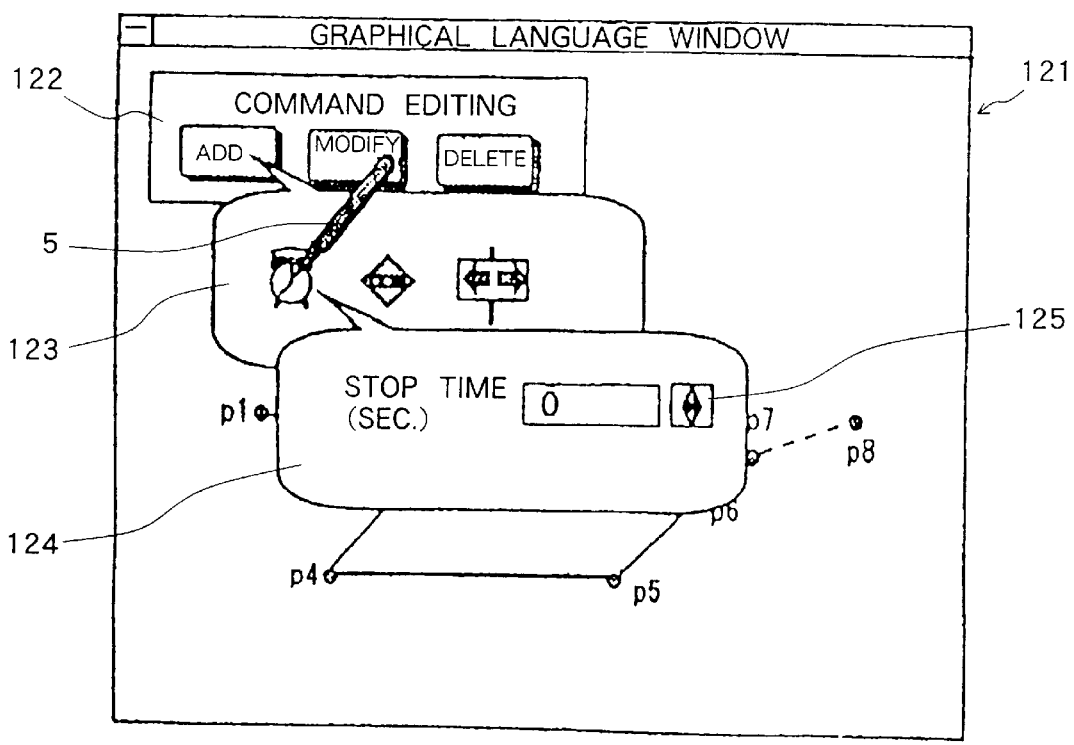
FIG. 18c is a view of a picture for establishing a waiting time for a timer.

As shown in FIG. 18b, a subwindow 123 in the form of a pop-up window displaying commands to be added appears in the command editing window 121. Here, the subwindow 123 displays therein an icon of a clock representing a timer waiting command, an icon of a traffic signal representing an input waiting command, and an icon of a street mark representing a conditional branch command. The street mark icon is in the form of a sign with right and left arrows. The operator selects the clock icon with the entry pen 5. As a result, as shown in FIG. 18c, a subwindow 124 in the form of a pop-up window for setting a time appears in the command editing window 121. The subwindow 124 displays therein a display area for a stop time and a fine adjustment button 125. The operator may operate the fine adjustment button 125 to select a desired waiting time.

Figures 19, 20:
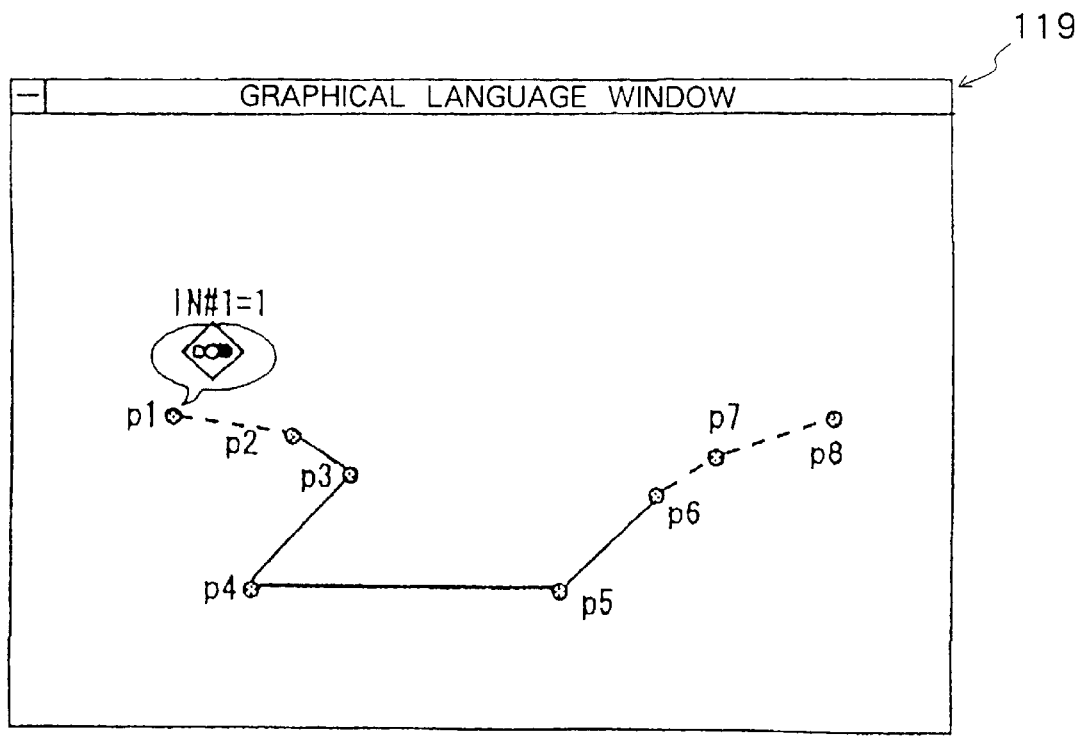
FIG. 19 is a diagram showing an example of a robot operating program which contains an input waiting command.
FIG. 20 is a view of an example of a displayed picture in which the input waiting command is displayed as an icon.

A teaching process with respect to an input waiting command will be described below. FIG. 19 shows a robot operating program 118 which contains an input waiting command. The robot operating program 118 is the same as the robot operating program 103 shown in FIG. 7, with an input waiting command added immediately after the p1 motion command. Based on the robot operating program 118, the display screen 12 displays thereon a picture 119 shown in FIG. 20. The displayed picture 119 is the same as the displayed picture 104 shown in FIG. 8, with a traffic-signal-shaped icon positioned near the teaching position p1. This icon indicates that an input waiting command is present. The icon is accompanied by a character string representing from which peripheral device the program waits for an input.

Figure 21:
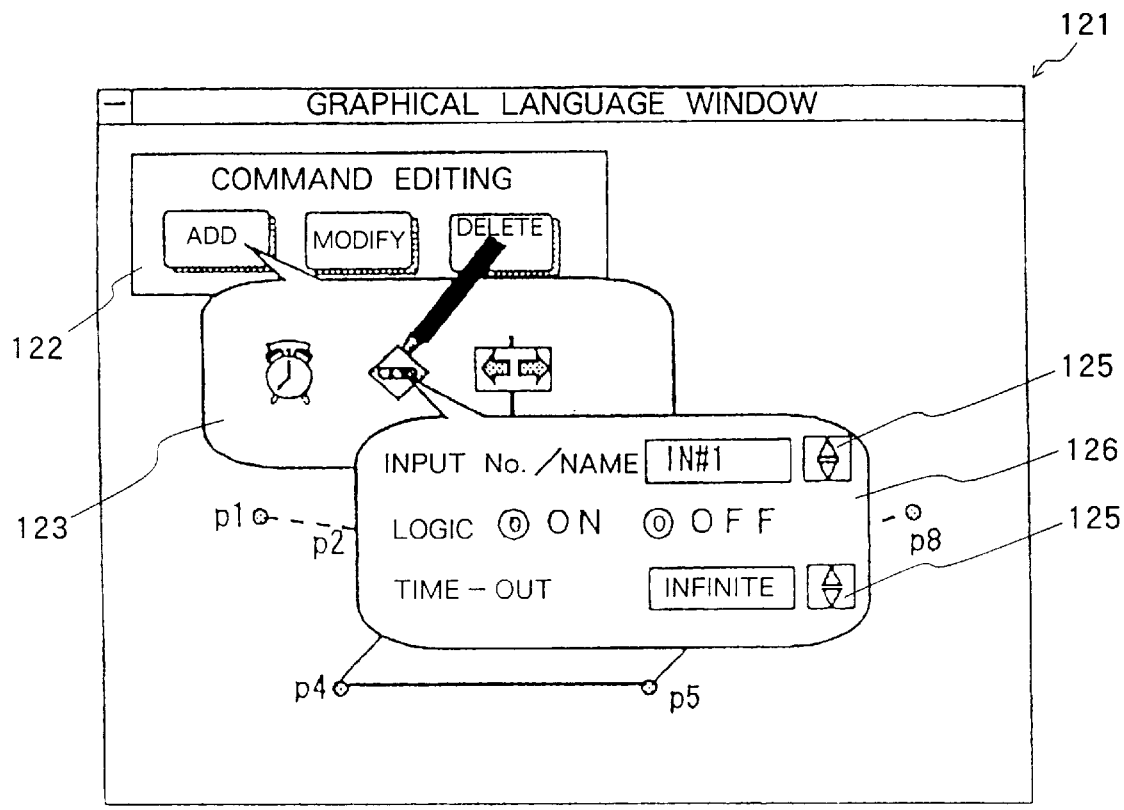
FIG. 21 is a view of an example of a displayed picture for establishing input waiting conditions.

The procedure for adding an input waiting command will be described below. As with the above procedure for adding a timer waiting command, the programming pendant 11 is brought into the command adding mode in which the command editing window 121 is displayed. The operator designates the number of a position where a command is to be added. The operator then selects a traffic-signal-shaped icon from the subwindow 123. As shown in FIG. 21, a subwindow 126 in the form of a pop-up window for establishing waiting conditions appears, and the operator may establish an external input name, a waiting logic, and an allowable waiting time (time-out) in the subwindow 126 with the entry pen 5.

A teaching process with respect to a conditional branch command will be described. Although not shown, when there is a conditional branch command, the conditional branch command is displayed as a street-mark-shaped icon in a displayed picture as a graphical language window, as with the timer waiting command and the input waiting command. For adding a conditional branch command, as with the above procedure for adding a timer waiting command, the programming pendant is brought into the command adding mode in which the command editing window is displayed. The operator designates the number of a position where a command is to be added. The operator then selects a street-mark-shaped icon in the subwindow for selecting commands. When in a subwindow for establishing a branch condition, the operator may establish an external input name, a branch logic, an allowable waiting time, and a display path designation in the subwindow with the entry pen 5. The display path designation is a designation as to which side of the branch is to be displayed in the graphical language window.

The buttons "MODIFY" and "DELETE" in addition to the button "ADD" in the subwindow 122 will be described below.

The button "MODIFY" is used to modify an operation command. For modifying an operation command, the operator selects a displayed command icon (e.g., the clock-shaped icon for the timer command in the displayed picture 117 shown in FIG. 17), whose command is to be modified, with the entry pen 5, making it an object to be edited. Then, the operator operates the button "MODIFY", bringing the programming pendant into a mode for modifying operation commands. As a result, a pop-up window is opened in the displayed picture, and displays a group of icons indicative of operation commands that can be modified. The operator then designates an icon of a modified operation command with the entry pen 5. If there are parameters accompanying the modified operation command, then a window for establishing parameters is opened, and the operator may establish parameters in the window. As a result, the graphical language processor 14 converts the modified operation command and parameters into internal intermediate code, automatically modifies a corresponding command in the memory 15, and displays a graphical language window based on the modified details.

The button "DELETE" is used to delete an operation command. For deleting an operation command, the operator selects a displayed command icon, whose command is to be deleted, with the entry pen 5, making it an object to be edited. Then, the operator operates the button "DELETE", bringing the programming pendant into a mode for deleting operation commands. The graphical language processor 14 deletes the designated command from the operation command in the memory 15, and updates the graphical language window based on the deleted details.

If there is a command for calling another operating program from within the main program, the programming pendant 11 according to this embodiment displays an icon which represents a program call in relation to the point of a motion command. When the icon is selected with the entry pen 5, a pop-up window is opened, making it possible to display and modify the operating program which is to be called. A selector switch is available for determining whether or not to display a program which is called. When the selector switch is operated with the entry pen 5, the displayed picture switches to the operating program to be called.

The programming pendant 11 according to this embodiment has been described primarily with respect to the relationship between operations made by the operator and changes in the displayed picture. Software-processed operation of the programming pendant 11 according to the present embodiment will be described below.

As described above, the programming pendant 11 comprises a computer as a hardware arrangement and a software program installed in the computer for carrying out an easy teaching process. The hardware arrangement may be a hardware arrangement for use as a portable personal computer, and a basic OS (Operating System) may be, for example, MS-WINDOWS™ manufactured by Microsoft Co. Therefore, a programming pendant based on a graphical user interface can easily be developed.

The programming pendant 11 whose internal constitution is shown in FIG. 6 exchanges the operating program of the robot 40 and other data with the controller 20 by way of serial transmission through the cable 6. When the operator newly generates an operating program with the programming pendant 11, a framework of the generated operating program is transmitted through the communication unit 13 to the controller 10.

The relationship between the sequence of a teaching process with respect to a workpiece and software functions will hereinafter be described below.

Figure 22:
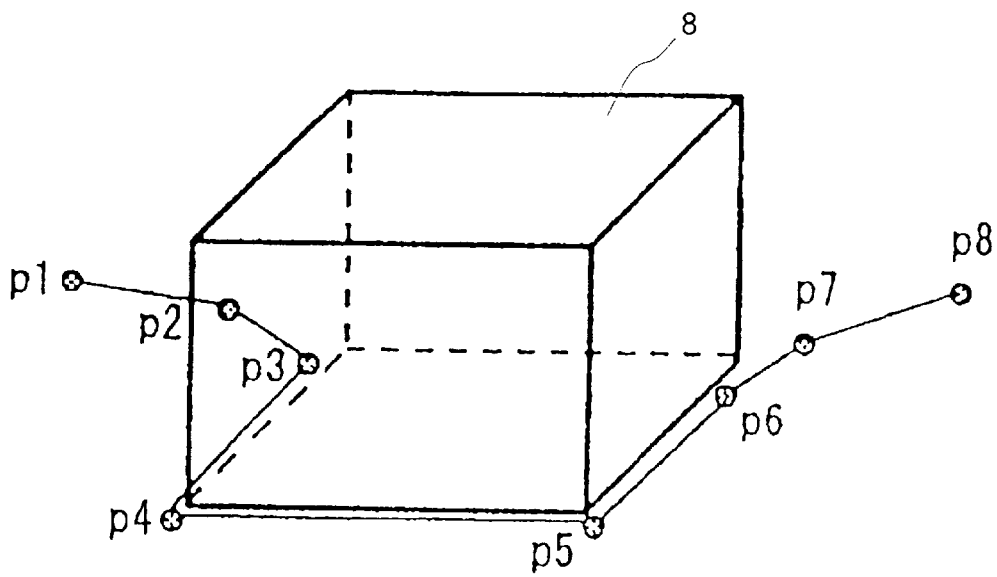
FIG. 22 is a diagram illustrative of an example of the layout of a workpiece and teaching points in an actual space.

Teaching of motion commands will first be described below. FIG. 22 shows the layout in an actual space of a workpiece 8 and teaching points p1–p8 in an operating program. In the illustrated example, the workpiece is in the form of a rectangular block.

The programming pendant 11 has a robot remote control switch. The operator operates the robot remote control switch to teach the robot position commands p1, p2, p7, p8 in a non-welding interval (hereinafter referred to as an air-cut interval) as joint operations, and position commands p3, p4, p5, p6 in a welding interval as linear interpolation operations. When the programming pendant 11 is thus operated, the programming pendant 11 sends additional motion commands to the controller 20, which successively adds these motion commands to the operating program. At this time, the operator may only teach a welding start point, corner points, and a welding end point with respect to the welding interval. The operator does not need to pay attention to orientations, but may roughly teach orientations.

A process of automatically optimizing the operating program will be described below.

(1) Automatic establishment of welding conditions:

When the operator operates to automatically optimize the operating program, welding conditions are first automatically established. At this time, the memory 15 stores an operating program 52 with physical welding conditions established as internal control codes and system configuration data 52 which has been established when initialized. The system configuration data comprises parameters which do not basically change during operation of the robot, such as performance details of the robot used in the welding robot system (movable ranges and maximum operating speeds of the axes, etc.), the type and ratings of the welding machine, the type and standards of the welding wire, and the types of gases that make up the welding atmosphere.

Figure 23:
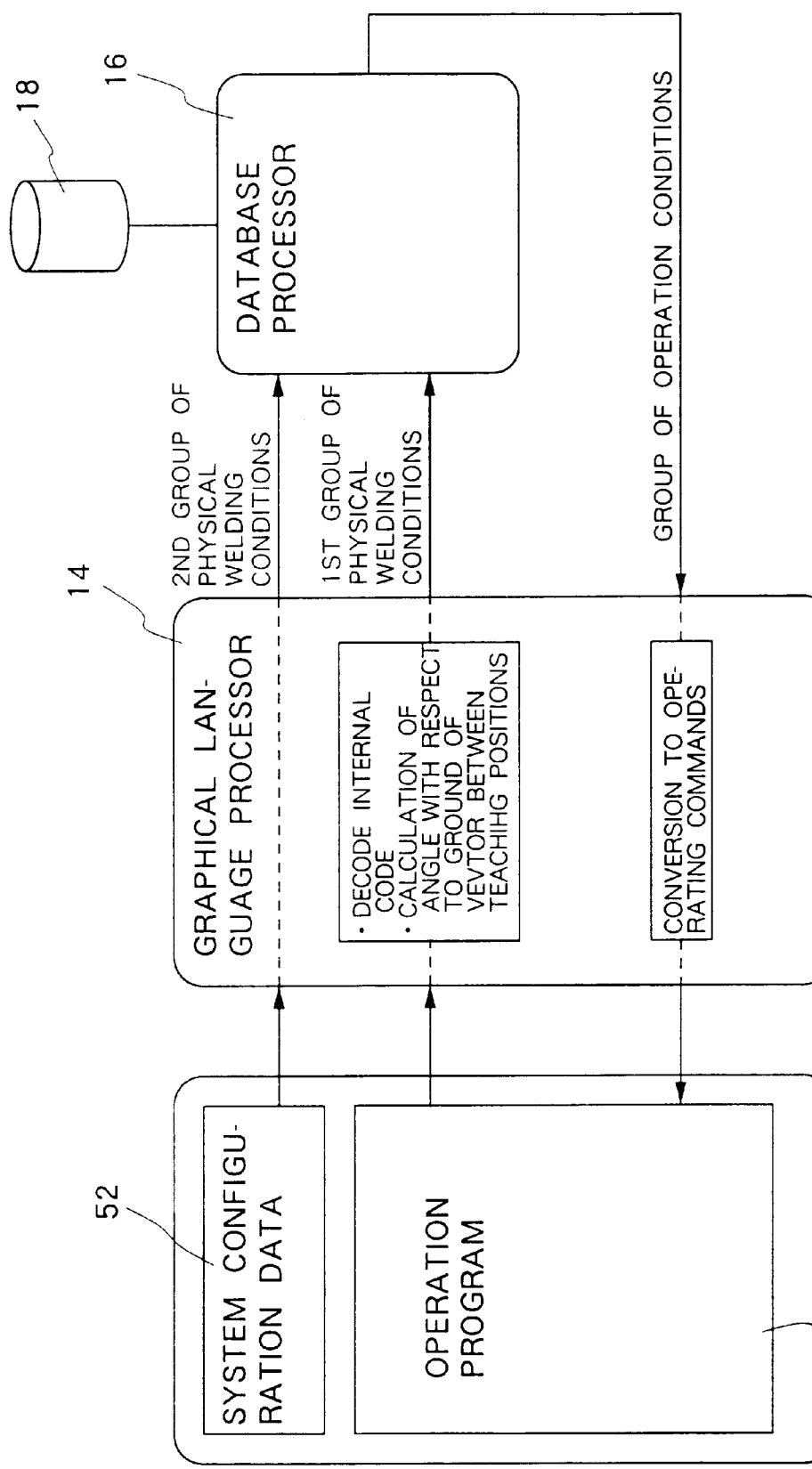
FIG. 23 is a diagram illustrative of a flow of data for automatically optimizing an operating program.

In response to the entry of a command for automatic optimization, the graphical language processor 14 sends data of a first group of physical welding conditions from data described as internal control codes of the operating program and data of a group of vectors interconnecting teaching points, among the data stored in the memory 15, to the database processor 16, and requests the database processor 16 to search the welding condition database 18. FIG. 23 shows a flow of the data at this time. The data of the first group of physical welding conditions represent a joint shape, a workpiece thickness, a workpiece material, and angles, with respect to ground, of vectors between teaching positions. The database processor 16 searches the welding condition database 18 based on data of a second group of physical welding conditions (the welding machine, the wire, and the gases) in the system configuration data 52 and the first group of physical welding conditions, and returns a group of operating conditions including welding current, welding voltage, welding speed, and welding torch orientation, etc. as results of the search, to the graphical language processor 14. As a consequence, the graphical language processor 14 converts the welding current, the welding voltage, and the welding speed into respective operation commands for the robot, and adds the operation commands in the operating program 51 at appropriate positions therein.

(2) Automatic modification of orientations and automatic addition of orientation changing points:

The automatic establishment of welding conditions is followed by the automatic addition of orientation changing points and the automatic modification of orientations. The operator needs to be skilled in order to teach the robot optimum orientations. The programming pendant according to this embodiment has the position/orientation generator 17 for calculating a torch position and orientation from given conditions to automatically modify orientations and automatically add orientation changing points. The process of automatically modifying orientations and the process of automatically adding orientation changing points are started when the graphical language processor 14 sends a motion command and designated welding torch orientation data to the position/orientation generator 17. When the position/orientation generator 17 receives the supplied data, the position/orientation generator 17 effects the following generating process: The orientation changing points are auxiliary points positioned to smoothly join orientations while maintaining appropriate orientations with respect to the workpiece. Generally, welding processes require such orientation changing points on either side of a corner point.

First, orientations at the points p3–p7 which are teaching points included in the welding interval are changed to designated torch orientations. An orientation changing point p4pre of the same orientation as the point p3 is added in the vicinity of the point p4 on the line between the points p3, p4. A pre point means a pre-teaching point, and is a teaching point which precedes an existing teaching point in order to make a smooth change between orientations of the robot. Then, an orientation changing point p5pre of the same orientation as the point p4 is added in the vicinity of the point p5 on the line between the points p4, p5. Similarly, an orientation changing point p6pre of the same orientation as the point p5 is added in the vicinity of the point p6 on the line between the points p5, p6.

Thereafter, an orientation changing point p4post of the same orientation as the point p4 is added in the vicinity of the point p4 on the line between the points p4, p5. A post point means a post-teaching point, and is a teaching point which follows an existing teaching point in order to make a smooth change between orientations of the robot. Then, an orientation changing point p5post of the same orientation as the point p5 is added in the vicinity of the point p5 on the line between the points p5, p6.

After this the orientations at the points p4, p5 are changed according to a procedure described below. Since the same algorithm is used with respect to both the points p4, p5, a general point pN will be described below.

A vector pNpre—pN is defined as a vector v1, a vector pN—pNpost as a vector v2, and a vector v3 as a unit vector of the product of the vectors v1, v2.

$$v3 = v1 \times v2$$

It is assumed that an angle produced by subtracting an angle formed between the vectors v1, v2 from 180 degrees is represented by α.

$$\alpha = \pi - \angle v1 v2$$

A 3×3 matrix which represents an orientation at pNpre is indicated by O, and a matrix which represents an orientation produced when the matrix O is rotated α/2 about the vector v3 is indicated by O'. The orientation at the point pN is replaced with O'. In this manner, an orientation is automatically changed, and an orientation changing point is automatically added.

(3) Optimization of positions with operation limits and interference avoidance:

The automatic addition of orientation changing points and the automatic modification of orientations are followed by optimizing positions with operation limits and interference avoidance. In this embodiment, the operation limits and interference avoidance utilized redundancy with respect to the direction of approach of the torch.

First, a group of position/orientation data is generated by rotation in angular displacements of 5 degrees within a range of ±90 degrees about an approaching direction at each of the points in the welding interval in the operating program. Each of the position/orientation data is converted from orthogonal space coordinates into joint coordinates, and data in which a welding cable connected to the robot and the robot interfere with each other and data relative to operation limits of the axes are excluded. Then, position/orientation data, one item at each point, is selected which will minimize the change in each axis if the robot is actually operated at each position. The positions at the respective points are replaced with the group of position/orientation data thus selected for positional optimization.

(4) Confirmation and automatic correction of operating speeds:

The optimization of positions with operation limits and interference avoidance is followed by confirmation and automatic correction of operating speeds.

The operating program which has been generated at a speed derived by a database search is simulated for operation to check if the operating speeds of the respective axes exceed an allowable maximum operating speed. If there is a position in which the operating speed exceeds the allowable maximum operating speed, then the established speed is lowered by a ratio of the simulated maximum speed of the axis which exceeds the maximum speed when moved to the point, to the allowable maximum speed. When the operating program is simulated for operation, the surface model of the robot as shown in FIG. 9 is displayed in an animated fashion, allowing the operator to gain an intuitive understanding the operating speeds of the respective axes.

(5) Re-changing of welding conditions:

If the established speed is changed by confirmation and automatic correction of operating speeds, the welding conditions are re-changed accordingly.

When the position/orientation generator 17 indicates to the graphical language processor 14 that the established speed is lowered, the graphical language processor 14 adds the changed speed to the first group of physical welding conditions, and causes the database processor 16 to search the database 18 again. The graphical language processor 14 replaces the parameters of the established operating commands with welding current, welding voltage, and welding speed which have been obtained by the search of the database 18.

As described above, a series of automatic optimization processes are carried out.

In the present embodiment, an operating program is completed by executing the above processes. Generally, a plurality of such operating programs are generated for the types of workpieces to be processed. Heretofore, such operating programs are stored with file names, i.e., names expressed in characters, in the controller. However, it has often happened for the operator to forget file names and fail to quickly call desired operating programs. According to this embodiment, the operator generates a symbol (icon) comprising a picture and characters on the programming pendant 11 with pen touches, and associates the icon with an operating program. This association is stored in the memory 15 of the programming pendant 11.

FIG. 24 shows a program selection window 130 displaying six operating programs as symbols corresponding to the programs. The program selection window 130 is displayed on the display screen 12 of the programming pendant 11. When the operator selects the desired icon displayed in the program selection window 130, the operator can select a corresponding operating program. In the illustrated example, the symbols comprise square frames in which characters and pictures are drawn, operating programs entitled "TEST-1", "TEST-2", "OPERATION-1", "OPERATION-2", "OPERATION-3", "OPERATION-4" are associated with the symbols that are positioned above the names of the operating programs.

Since pictures and handwriting drawn by the operator are displayed, the operator finds it very easy to identify details of the operating programs. Furthermore, instead of the handwritten information entered by the operator, image information captured by a camera may be displayed as symbols.

Third Embodiment

A third embodiment of the present invention will be described below. In the second embodiment, no workpiece is displayed in the graphical language window. According to the third embodiment, a workpiece is displayed in the graphical language window, allowing the operator to teach the robot simply even if the workpiece has tilt angles and rotational angles.

The third embodiment is directed to a welding robot system as with the second embodiment, and employs the same programming pendant 11 as the one used in the second embodiment. However, the graphical language processor 14 calculates an angle (hereinafter referred to as a tilt angle) formed between a straight line passing through two teaching positions on the workpiece and the ground, from two successive teaching positions according to motion commands, and automatically registers the calculated angle as an element in the first group of welding conditions. The graphical language processor 14 also calculates an angle (hereinafter referred to as a rotational angle) through which the workpiece rotates about an axis comprising a straight line passing through two teaching positions on the workpiece, from the three-dimensional coordinates at the two successive teaching positions according to motion commands and a reference point stored in the memory 15, and automatically registers the calculated angle as an element in the first group of physical welding conditions. Furthermore, the graphical language processor 14 automatically establishes a shape and dimensions of the workpiece from the data of the first group of physical welding conditions, and displays the shape of the workpiece as a wire frame, a surface model, or a shading model, together with a path of the robot tool (the welding torch in this embodiment) in the graphical language window.

As described above, the teaching points according to motion commands are allotted respective numbers in a time series. In this embodiment, when an interval specified by such a number is designated, only the specified interval is displayed in the graphical language window.

Figure 25:
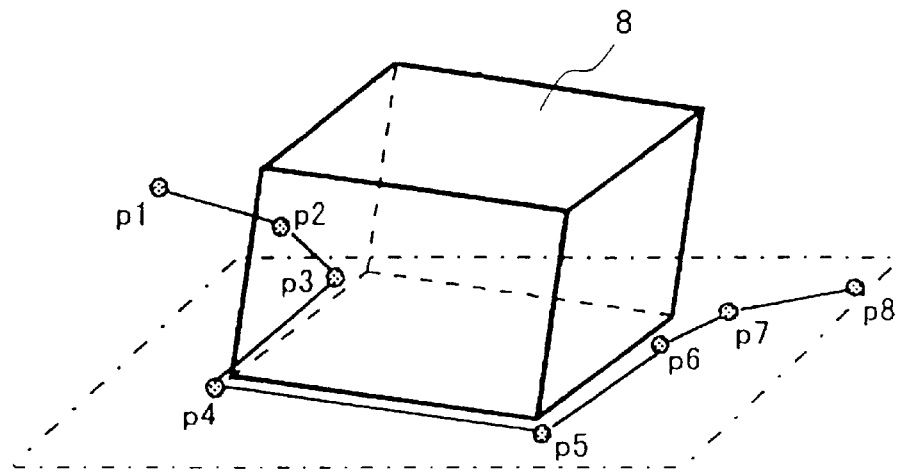
FIG. 25 is a diagram illustrative of an example of the layout of a workpiece and teaching points in an actual space according to a third embodiment of the present invention.

FIG. 25 shows the layout of a workpiece and teaching points in an actual space according to this embodiment. Here, the workpiece 8 is disposed at a rotational angle and a tilt angle. A process of teaching for the welding robot with respect to the workpiece 8 will be described below.

As with the second embodiment, the operator operates the robot remote control switch on the programming pendant 11 to teach position commands p1, p2, p7, p8 in an air-cut interval as joint operations, and position commands p3, p4, p5, p6 in a welding interval as linear interpolation operations. When the programming pendant 11 is thus operated, the programming pendant 11 sends additional motion commands to the controller 20, which successively adds these motion commands to the operating program. At this time, the operator may only teach the robot a welding start point, corner points, and a welding end point with respect to the welding interval. The operating program by the above teaching process has the same details as shown in FIG. 7.

Figure 26:
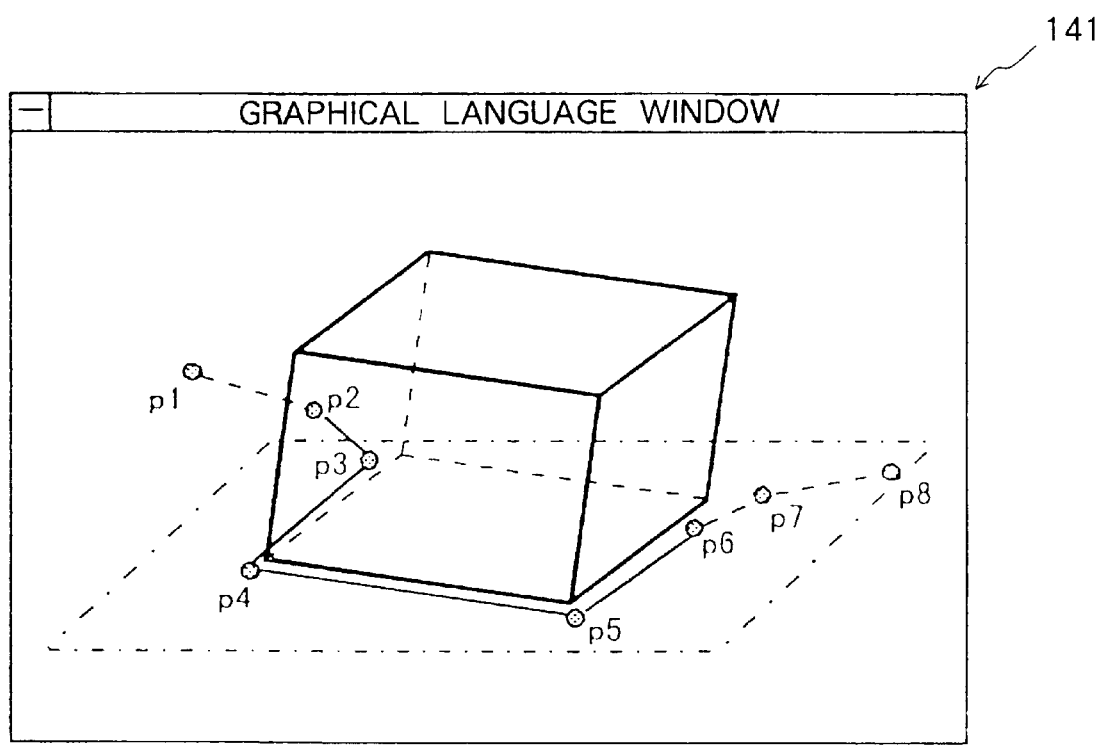
FIG. 26 is a view of a displayed picture of a group of motion commands presented in a graphical representation in the third embodiment.

The details which have been taught are displayed as a three-dimensional path as viewed from an arbitrary viewpoint on the display screen 12 by the graphical language processor 14. At this time, joint motion intervals are displayed in broken lines, and linear and circular interpolation intervals are displayed in solid lines. FIG. 26 shows a displayed picture 141 which is displayed as a graphical language window on the display screen 12 at this time. Here, the displayed picture 141 includes a surface model of the workpiece along with teaching points and line segments that interconnect the teaching points.

Then, the operator designates a welding interval with respect to the displayed graphical window as shown in FIG. 26. The welding interval is designated and the displayed image changes after the designation of the welding interval in the same manner as with the second embodiment described previously. The robot operating program with the designated welding interval has details which are the same as those shown in FIG. 10.

Then, the operator establishes physical welding conditions. Intervals are selected with the entry pen 5, and physical welding conditions are established in each of the intervals by selecting a joint shape, a workpiece thickness, and the type of a workpiece material, which are displayed as icons or characters on an establishing window, as with the second embodiment. The established details are automatically processed as operational shape dimensions by the graphical language processor 14, which displays a workpiece model suitable for the joint shapes in the establishing intervals as a surface model on the display screen 12 as with the displayed image shown in FIG. 26. The established details are also described as internal control codes immediately after the welding start command in the operating program by the graphical language processor 14. The robot operating program thus established is the same as that shown in FIG. 12.

Then, a process of automatically optimizing the operating program is carried out. Here, as with the second embodiment, welding conditions are automatically established depending on the first group of physical welding conditions and the second group of physical welding conditions. A joint shape, a workpiece thickness, a workpiece material, and tilt and rotational angles between teaching positions are used as the first group of physical welding conditions.

Designation of the range of points to be displayed, hereafter refer to as the display range, according to this embodiment, will be described below. With the programming pendant, a window for designating a display range is displayed when the operator double-clicks the entry pen 5 while a graphical language window is being displayed on the display screen 12, and the operator can designate a display start point and a display end point in the window for designating a display range. Designated teaching point numbers entered as a display start point and a display end point are sent to the graphical language processor 14, which displays teaching information within the range represented by the designated teaching point numbers in the displayed window. FIG. 27 shows a displayed window 142 for designating a display range. Here, the displayed window 142 contains a subwindow 143 for entering a display start point and a display end point. In the illustrated example, since a point p3 is designated as a display start point and a point p6 as a display end point, only an interval from the point p3 to the point p6 is displayed. If necessary, the interval may be displayed at an enlarged scale.

As described above, when a range is displayed by designating time-series numbers of motion commands described in the operating program, a motion command interval corresponding to the range is displayed in detail for allowing the operator to confirm the operating program in detail. The operator can thus confirm the operating program with greater safety than confirming the operating program by bringing his or her face directly close to the workpiece. In this embodiment, tilt and rotational angles of the workpiece are automatically calculated, and registered in physical welding conditions, and conditions are selected which are suitable for the workpiece according to the registered data. Therefore, the operating program can be generated within a short period of time regardless of the complexity of the shape of the workpiece.

Fourth Embodiment

A fourth embodiment of the present invention will be described below. In the second embodiment described previously, a tool path is displayed in the graphical language window by a representation which comprises line segments interconnecting teaching points. According to this embodiment, a tool path can be displayed on the basis of a designated interpolation type. If an inappropriate interpolation type is designated, an alarm is issued, and teaching points can automatically be added. Further, an overall robot image and a tool orientation in each of the teaching positions can also be displayed in a graphical representation.

This embodiment is directed to a welding robot system as with the second embodiment, and employs the same programming pendant 11 as the one used in the second embodiment. However, the graphical language processor 14 can decode the operating program which is stored as intermediate code in the memory 15, interconnect orthogonal space positions of a group of motion commands stored in a time series, with straight lines or curved lines depending on the type of interpolation of the motion commands, convert the group of lines into coordinates on the display screen 12 as viewed from an arbitrary viewpoint, and display the converted group of lines on the display screen 12 and the orientations of the tool at the respective teaching positions, for thereby displaying the overall image of the robot at the teaching positions of the motion commands as a wire frame, a surface model, or a shading model. When supplied with a gap distance between workpieces, the graphical language processor 14 displays dual lines, with the distance therebetween being variable depending on the gap distance, in a graphical language representation.

If the type of interpolation of motion commands as intermediate codes is inappropriate, the graphical language processor 14 displays an alarm on the display screen 12, and automatically adds teaching points. Specifically, when a line is displayed in the graphical language window, if the type of interpolation of motion commands represented by intermediate code is circular interpolation and the number of teaching points is smaller than the minimum number of teaching points (3 points) necessary for circular interpolation, then the graphical language processor 14 changes the line displayed on the display screen 12 to a wavy line or the like, indicating that the robot cannot move along an arcuate path in that interval. If there is one time-series teaching point for circular interpolation, then when the operating program is generated, the motion command can automatically be linearly interpolated. If there are two time-series teaching points for circular interpolation and there is a teaching point not for circular interpolation, next to the second teaching point for circular interpolation, then when the operating program is generated, a teaching point for circular interpolation can automatically be added at the position and orientation of non-circular teaching point.

A teaching process according to the this embodiment for referring to and editing an operating program with motion commands already taught, using the programming pendant, for thereby completing a welding operating program will be described below on the basis of the relationship between operations made by the operator and changes in the displayed details. It is assumed that an operating program 151 shown in FIG. 28 has already been taught. The operating program 151 differs from the operating program 103 shown in FIG. 7 in that motion commands with respect to three consecutive teaching points p4, p5, p6 are indicated for circular interpolation operation.

Figure 29:
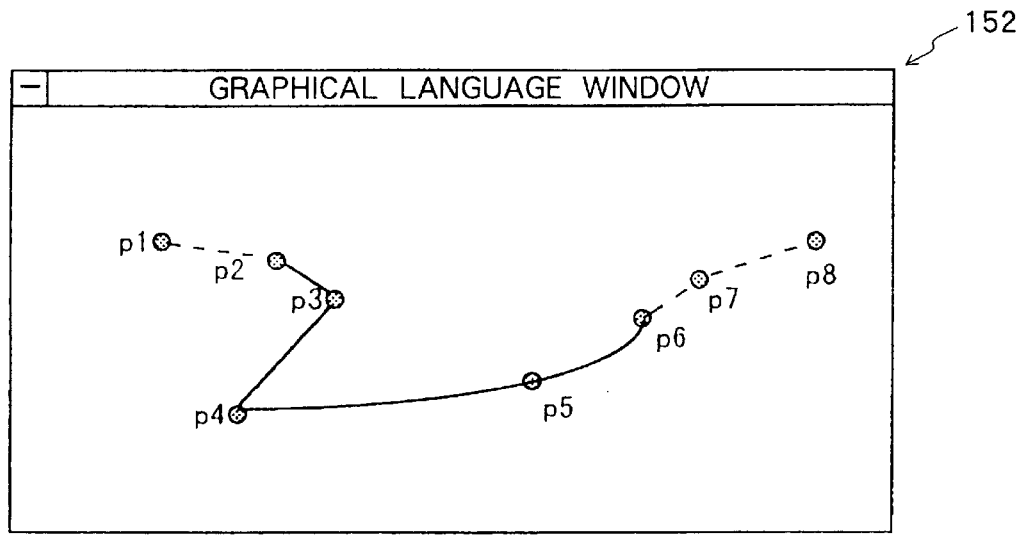
FIG. 29 is a view of a displayed picture of the group of motion commands presented in a graphical representation in association with the robot operating program shown in FIG. 28.

The group of motion commands thus taught are displayed as a three-dimensional path as viewed from an arbitrary viewpoint on the display screen 12 by the graphical language processor 14. At this time, joint motion intervals are displayed in broken lines, and linear and circular interpolation intervals are displayed in solid lines. FIG. 29 shows a picture 151 which is displayed as a graphical language window on the display screen 12 at this time. Since an interpolation process with respect to points p4, p5, p6 is circular interpolation, an interval from the point p4 to the point 6 is displayed as an arc. Time-series numbers of the motion commands are displayed in the vicinity of the teaching positions. The joint motion intervals represent the path of the torch tip which is actually operated.

Figure 30:
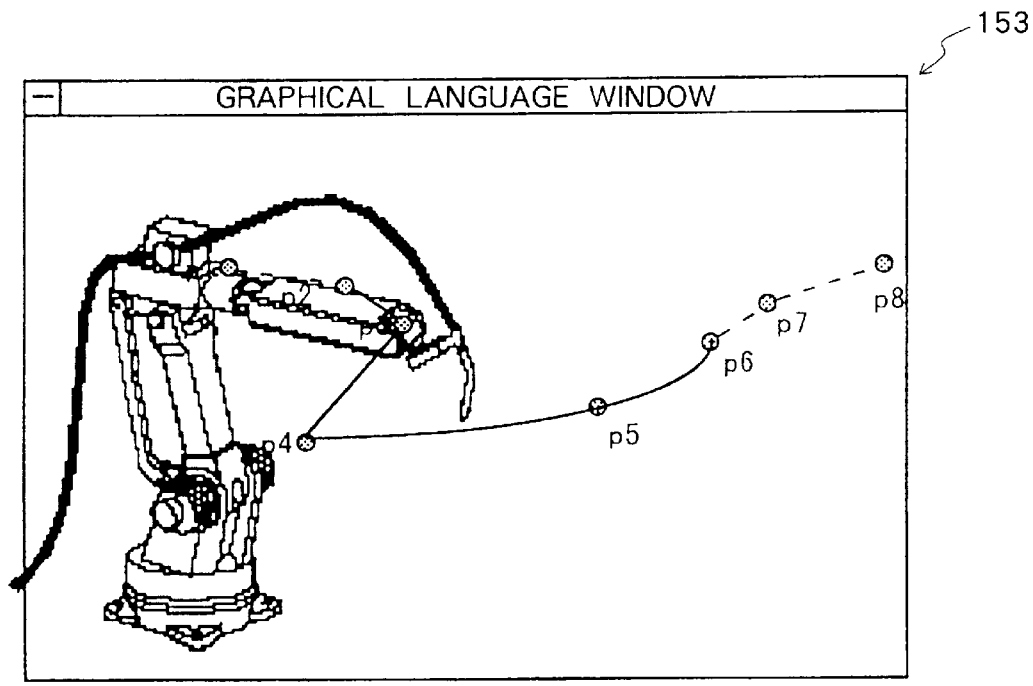
FIG. 30 is a view of an example of a displayed picture in a mode for displaying a robot and a torch in the fourth embodiment.
Figure 31:
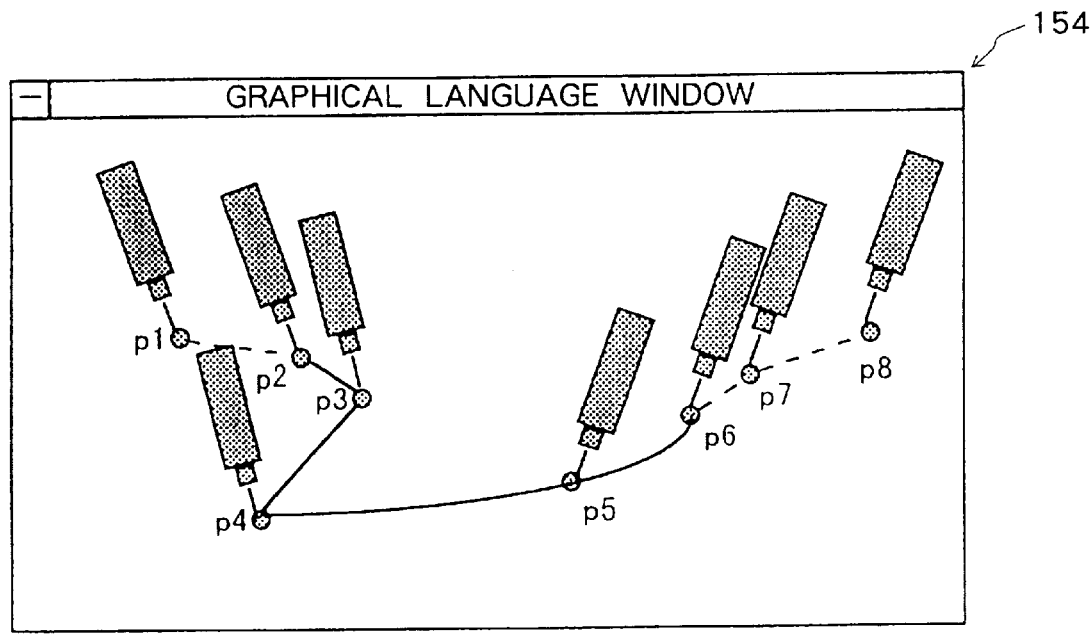
FIG. 31 is a view of an example of a displayed picture in a mode for displaying all orientations of the torch in respective teach positions in the fourth embodiment.

According to this embodiment, as with the second embodiment, surface models of the torch and the robot are displayed simply by designating, with the entry pen 5, the numbers displayed at the teaching positions. A display mode switch as a soft switch on the display screen 12 may be operated to switch between displayed and non-displayed states of these surface models. FIG. 30 shows a displayed picture 153 in a mode for displaying the robot and the torch. When another display mode is selected by the display mode switch, all torch orientations at the respective teaching positions are displayed on the display screen 12. The display mode switch may be operated to switch between displayed and non-displayed states of all torch orientations. FIG. 31 shows a displayed picture 154 in a mode for displaying all torch orientations at the respective teaching positions.

Figure 32:
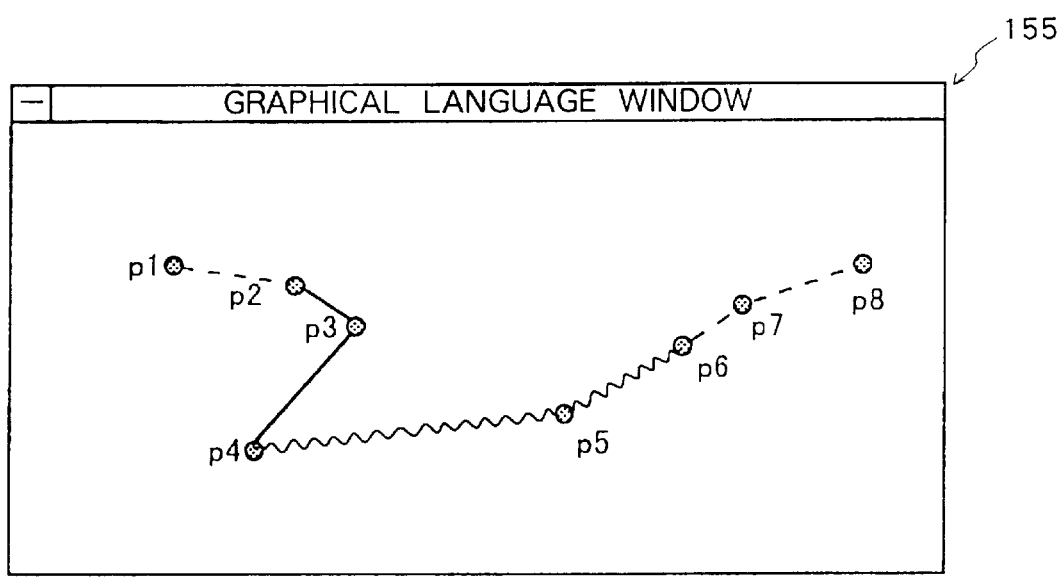
FIG. 32 is a view of an example of a displayed picture where circular interpolation cannot be performed.

If the teaching point p5 is for circular interpolation, and either one of the points p4, p6 is for circular interpolation and the other for linear interpolation in the operating program shown in FIG. 28, then the requirement for circular interpolation that three consecutive teaching points be for circular interpolation is not met, and the robot fails to move along an arcuate path. In such a case, a window 155 for indicating an interval incapable of circular interpolation in a wavy line is displayed as a graphical language window. FIG. 32 shows this displayed window 155.

In this example, because there are two consecutive teaching points for circular interpolation, a teaching point for circular interpolation may automatically be added according to an instruction from the operator based on the principle of automatic addition of a teaching point as described above.

Figures 33, 34:
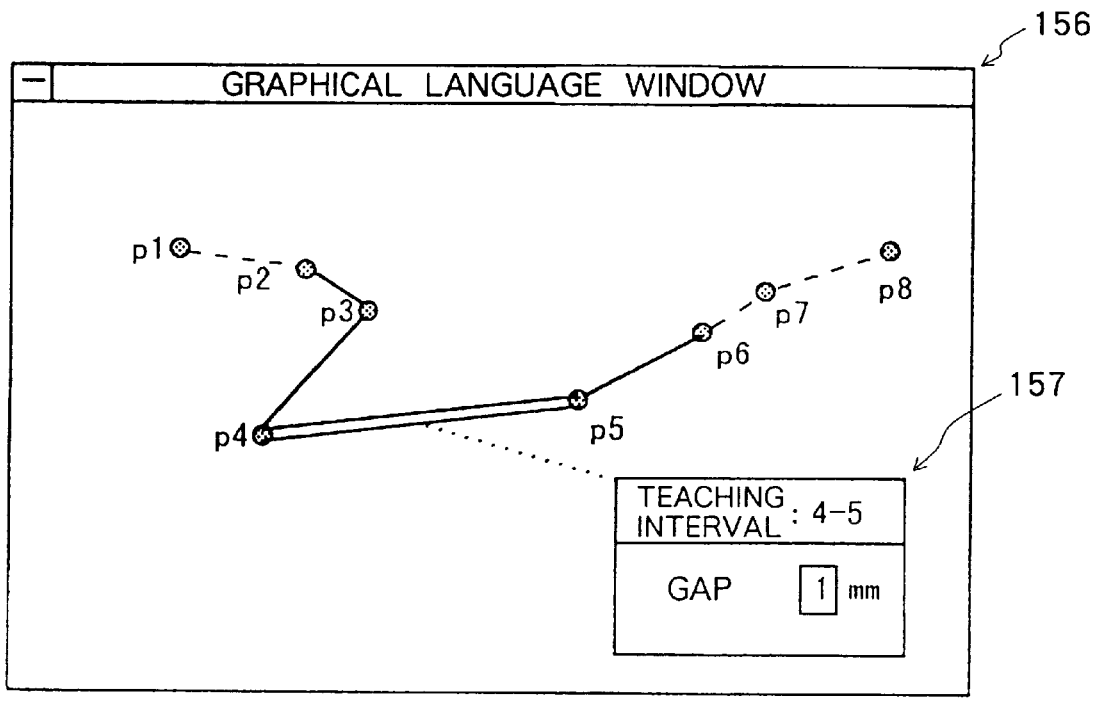
FIG. 33 is a view of an example of a displayed picture for establishing a gap distance.
FIG. 34 is a diagram showing an example of a robot operating program with motion commands already taught according to a fifth embodiment of the present invention.

In the present embodiment, a window for entering a gap distance between workpieces can be displayed when a line interconnecting two adjacent teaching points, e.g., a line interconnecting the points p4, p5, is selected with the entry pen 5. FIG. 33 shows a displayed window 156 for establishing a gap distance. In the displayed window 156, a floating window 157 is open for entering a gap distance. When a gap distance is entered into the floating window 157, a designated line, e.g., the line interconnecting the points p4, p5, is turned into dual lines, whose gap distance is variable depending on the entered gap distance.

Because a gap distance can thus be established and displayed graphically, the operator can confirm derived operating conditions on the screen. Since the operator can easily confirm a location where the gap distance is established, the operator can quickly confirm and correct the generated robot operating program.

In this embodiment, an appropriate picture is displayed depending on the type of interpolation, and if there are not three teaching points for circular interpolation when the type of interpolation of motion commands is circular motion, then a picture indicating that three or more time-series teaching points are necessary is graphically displayed. Therefore, errors which the operator would otherwise make in selecting operating conditions are greatly reduced, and the operator is assisted in generating appropriate operating programs. Specifically, if the type of interpolation is circular interpolation and there is one time-series teaching point, then since the teaching point is automatically turned into a teaching point for linear interpolation when an operating program is generated, the robot is prevented from failing to operate. If the type of interpolation of moving commands is circular interpolation and there are two time-series teaching points, then since a third teaching point for circular interpolation is automatically added when an operating program is generated, the robot is also prevented from failing to operate.

Fifth Embodiment

In the second embodiment, in the process of automatically generating an operating program, the operating program is automatically optimized by automatically modifying orientations and automatically adding orientation changing points. When an orientation changing point is automatically added as a motion command, in the case where the point is simply added, then any future changes to the taught motion command cause a contradiction between the orientation changing point and the taught point with respect to the generated operating program. According to this embodiment, when the automatically added motion command is added to the operating program, information indicative of an association with the taught points is added to the automatically added motion command to prevent the occurrence of the contradiction.

Specifically, when an orientation changing point is automatically added, information related to motion information which has already been taught is stored in association with a motion command for the orientation changing point that is automatically added. For deleting a motion command which has already been taught from an automatically generated operating program, when a program is automatically generated again, a motion command for an orientation changing point that is automatically added in relation to the motion command to be deleted is identified on the basis of already stored information, and deleted. Similarly, for moving the position of a motion command which has already been taught, when a program is automatically generated again, a motion command for an orientation changing point that is automatically added in relation to the motion command to be deleted is identified on the basis of already stored information, and deleted, after which an appropriate orientation changing point is determined and automatically updated again.

The present embodiment will be described below with reference to a specific example. This embodiment is directed to a welding robot system as with the second embodiment, and employs the same programming pendant 11 as the one used in the second embodiment. In summary, the automatic optimization according to the second embodiment is a process for deriving an appropriate operating orientation from the welding condition database 18, correcting positional information of a group of motion commands according to the orientation, and bringing a relative orientation with respect to the workpiece as closely to the orientation retrieved from the welding condition database as possible. In the automatic optimizing process, therefore, an orientation changing point is automatically added in front of or behind a teaching point.

In this embodiment, with respect to an orientation changing point to be added in front of a teaching point, i.e., the pre point, a pseudo-command "'pre" is added in front of an automatically added motion command. With respect to an orientation changing point to be added behind a teaching point, i.e., the post point, a pseudo-command "'post" is added behind an automatically added motion command. These pseudo-commands "'pre", "'post" are based on a comment command "'" and represent information related to a motion command which has originally been present. The comment command "'", is a command indicating that a character string following this command represent a comment. The comment command "'" is a command which does nothing in the interpretation by the robot controller, and does not affect the execution of the operating program. In this embodiment, however, the graphical language processor 14 uses a character string which follows a comment command in decisions during the processing of the operating program. The pseudo-commands "'pre", "'post" are only effective with respect to one command which immediately follows the pseudo-commands.

FIG. 34 shows an operating program before an orientation changing point is automatically added thereto. When orientation changing points are automatically added to the operating program 161 shown in FIG. 34 in association with pseudo-commands "'pre", "'post", an operating program 162 shown in FIG. 35 is generated. In FIG. 35, descriptions which follow semicolons ";" are comments with respect to the program list (not actually on the graphical display), and indications of steps 1 through 15 are added to the program list in order to indicate certain commands in the program.

Figure 36:
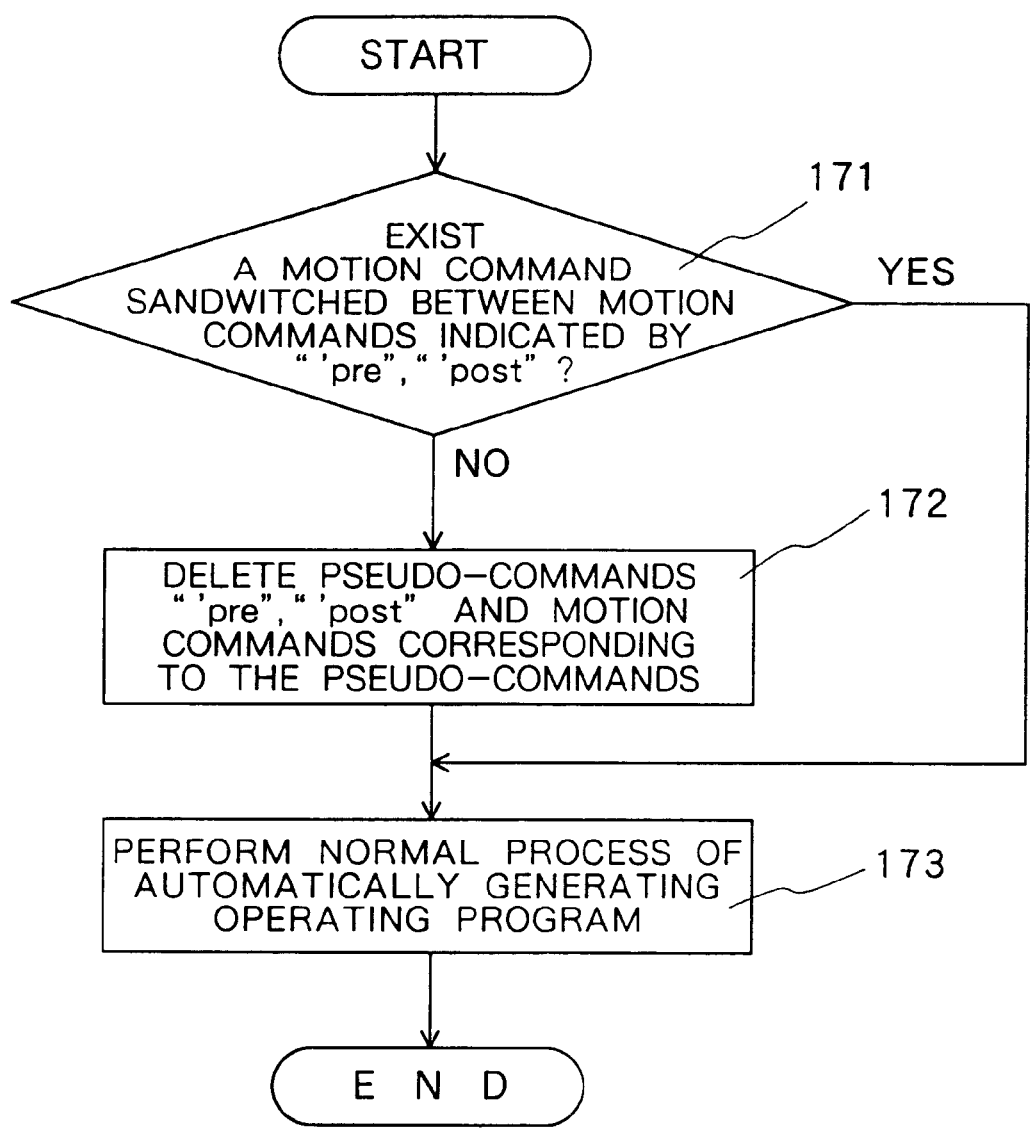
FIG. 36 is a flowchart of an operation sequence for automatically generating an operating program again after positions are removed in the fifth embodiment.

A process of automatically generating an operating program again after taught positions are deleted from an operating program which has already automatically been generated will be described below with reference to a flowchart shown in FIG. 36. The graphical language processor 14 decides whether there is a motion command sandwiched between motion commands indicated by pseudo-commands "'pre", "'post", in a step 171. If there is such a motion command, then control jumps to a step 173. If there is no such a motion command, then control proceeds to a step 172 in which the pseudo-commands "'pre", "'post" and the motion commands corresponding to the pseudo-commands "'pre", "'post" are deleted, after which control goes to the step 173. In the step 173, the normal process of automatically generating an operating program as described above in the second embodiment is executed.

If an operating program is automatically generated again after taught positions are changed in an operating program which has already automatically been generated, then the graphical language processor 14 regards motion commands not associated with pseudo-commands "'pre", "'post" as motion commands which have already been taught, and calculates all orientation changing points again.

In this embodiment, in as much as motion commands for orientation changing points added by the automatic generating process can be identified, motion commands for orientation changing points which have already been registered can automatically be edited appropriately by executing the automatic generating process again even after an editing process of deleting or changing the positions of motion commands which have already been taught.

INDUSTRIAL APPLICABILITY

As described above, the present invention offers the outstanding advantage that details of operation, such as welding operation, of a robot expressed by a program can be visually confirmed. Specifically, a process of referring to and editing a robot operating program which has heretofore been expressed on the basis of characters can easily be mastered even by novices because the process can be performed on the basis of pictures and characters (icons).

Furthermore, a path of positional data of a group of motion commands that have been taught is expressed by a three-dimensional line as viewed from an arbitrary viewpoint, and associated parameters and operating commands are graphically represented by pictograms, and robot and tool orientations can be confirmed. Therefore, details of robot operation can be confirmed without actually running an operating program with a real robot. Heretofore, it has been customary to generate a program and confirm robot operation by executing the generated program concurrently with each other. According to the present invention, because it is not necessary to confirm robot operation, the time required for teaching can greatly be reduced. When operating commands are to be added or changed, it is not necessary to confirm inserting or changing locations by operating the robot. As a result, the time required to edit the operating program is shortened.

If there are operating commands indicative of intervals, such as welding start and end commands, then those operating commands are represented by a color or type different from the color or type of the line indicative of the graphically represented path, allowing the operator to easily recognize an operating interval. Therefore, the conventional problem that the operator cannot recognize an operating interval without searching for start and end commands is solved. When an operating interval is established, both start and end positions are established. Consequently, there is no possibility of the generation of an improper operating program in which only a start command or an end command is registered. In as much as local positions and orientations can graphically be corrected, when an orientation or a position is to be slightly modified, it does not need to be modified while the robot is in operation, resulting in a reduction in the time required to edit the operating program.

According to the present invention, moreover, an operation database such as a welding condition database is provided, and simply when physical welding conditions are established in an graphical language window in relation to a displayed line, retrieved results from the operation database are converted into operating commands and added to appropriate locations. Inasmuch, performing conditions themselves can be understood by a novice not skilled in operating a robot, even the novice can generate a robot operating program. Performing conditions and operating conditions which have once been established are stored in association with each of generated operating programs. Accordingly, skills dedicated to certain operations such as welding can be accumulated. When a similar operating program is to be generated, operating conditions can easily be selected, with the result that the operating program can be generated in a short period of time.

If the present invention is applied to a welding robot, appropriate orientations depending operations are automatically established, and necessary orientation changing points are automatically added in front of and behind corner points. Automatic interference avoidance can be achieved with respect to these points. No skill is needed to teach the robot positions, but it is only necessary to teach a start point, an end point, and corner points. Therefore, even a novice who is not accustomed to operating the robot can teach positions in a short period of time.

We claim:

1. A robot language processing apparatus for displaying a robot program which has been already taught, comprising:

display means for graphically displaying a picture and capable of designating a position in the displayed picture with pointing means;

storage means for storing said robot program; and processing means for displaying an operation interval and an air-cut interval as successive lines on said display means by referring to said robot program, and controlling said display means to display the type of an operation detail at either one of said lines when said either one of the displayed lines is designated by said pointing means.

2. The robot language processing apparatus according to claim 1, wherein said robot program comprises an operating program for a welding robot, and when one of the lines is designated by said pointing means, said processing means changes a color or type of the designated line to indicate a type of welding process.

3. The robot language processing apparatus according to claim 1, wherein said robot program comprises an operating program for a welding robot, and said processing means moves a bright spot on the lines at a speed corresponding to a welding speed.

4. A robot language processing apparatus for describing operation details of a teaching-playback robot and teaching the robot, comprising:

display means for graphically displaying a picture and capable of designating a position in the displayed picture with pointing means;

storage means for storing said robot program as intermediate code; and language processing means for decoding said intermediate codes and connecting orthogonal space positions of a group of motion commands stored in a time-series manner with straight lines or curved lines, converting an obtained group of lines into coordinates in the displayed picture as viewed from an arbitrary viewpoint, graphically displaying the converted group of lines on said display means, and displaying time-series numbers of points in the group of motion commands in superimposed relation to the group of lines on said display means.

5. The robot language processing apparatus according to claim 4, wherein, when one of the displayed time-series numbers is designated by said pointing means, said language processing means graphically displays an orientation of a tool at a teaching position of the motion command corresponding to the designated number on said display means.

6. The robot language processing apparatus according to claim 4, wherein, said language processing means displays an overall image of the robot at the position designated by said pointing means on said display means.

7. The robot language processing apparatus according to claim 4, wherein, an operation interval is recognized on the basis of operation start and end commands in said intermediate code, and one of the displayed lines which corresponds to said operation interval is displayed in a different color or type.

8. The robot language processing apparatus according to claim 7, wherein, when a line in a start interval and a line in an end interval among the displayed lines are designated by said pointing means, said language processing means establishes an effective interval for an operating command based on the designated lines, and inserting the operating command into said intermediate code in said storage means.

9. The robot language processing apparatus according to claim 4, wherein said language processing means displays icons indicative of operation details on said display means, and when one of the displayed icons is selected by said pointing means, said language processing means inserts an operating command corresponding to the selected icon into intermediate code in said storage means.

10. The robot language processing apparatus according to claim 9, when said icon is selected, said language processing means displays a window for entering parameters related to corresponding to operation details on said display means, establishes parameters depending on details entered in said window, and inserts an operating command corresponding to the selected icon into intermediate code in said storage means.

11. The robot language processing apparatus according to claim 4, wherein, if an operating command which is neither a motion command nor a command indicative of an operation interval is present in said intermediate code, then said language processing means displays an icon representative of the operating command in relation to a point of a motion command on said display means.

12. The robot language processing apparatus according to claim 11, wherein, when an icon representative of said operating command is designated by said pointing means, said language processing means displays a pop-up window for displaying and establishing parameters associated with said operating command, and when parameters are established or changed, said language processing means changes a corresponding intermediate code based on the established or changed parameters.

13. The robot language processing apparatus according to claim 4, wherein if a mode for adding operating commands is designated, then said language processing means displays a group of icons of operating commands that can be added, determines a command adding position as designated by said pointing means, determines an operating command to be added which corresponds to one of the icons which is selected by said pointing means, converts the determined operating command into intermediate code, and inserts the intermediate code into a corresponding location in said storage means.

14. The robot language processing apparatus according to claim 4, wherein, if a mode for modifying operating commands is designated, then said language processing means displays a group of icons of operating commands that can be modified, employs, as a command to be modified, a first icon selected by said pointing means from the group of icons registered and displayed as operating commands in relation to an operation path, employs, as a modified operating command, a second icon selected by said pointing means from the group of icons of operating commands that can be modified, and replaces intermediate code at a corresponding location in said storage means.

15. The robot language processing apparatus according to claim 4, wherein, if a mode for deleting operating commands is designated, then said language processing means displays a group of icons registered and displayed as operating commands in relation to an operation path on said display means, employs, as a command to be deleted, an icon selected by said pointing means from said group of icons, and deletes intermediate code at a corresponding location in said storage means.

16. The robot language processing apparatus according to claim 4, further comprising a database relative to operations, and wherein said language processing means displays a group of icons indicative of physical operating conditions on said display means, and when one of the icons and an operation interval are selected by said pointing means, said language processing means searches said database based on the selected physical operating condition and the selected operation interval to read operating condition data therefrom, and converts the operating condition data into an operating command.

17. The robot language processing apparatus according to claim 16, wherein the robot program stored in said storage means is updated on the basis of the converted operating command.

18. The robot language processing apparatus according to claim 4, wherein if a mode for correcting a position and an orientation is designated, said language processing means determines an object to be corrected as designated by said pointing means, three-dimensionally displays a present teaching position on said display means, displays a button capable of continuously modifying a position and an orientation on said display means, determines correcting quantities for a position and an orientation depending on an operation effected on said button by said pointing means, and causes a motion command at a corresponding location in said storage means to reflect the corrected quantities.

19. A programming pendant for teaching an industrial robot having at least three degrees of freedom, comprising:
   display means for graphically displaying a picture and capable of designating a position in the displayed picture with pointing means;
   storage means for storing an operating program which contains target positional data for the robot described as motion commands;
   a database storing operating conditions; and
   language processing means for three-dimensionally graphically displaying a taught path on said display means, displaying a group of icons representing physical operating conditions when a straight line or a curved line interconnecting two arbitrary motion commands in the displayed path is designated by said pointing means, searching said database to read a group of operating conditions therefrom based on a first group of physical operating conditions determined on the basis of a position and an icon which are designated by said pointing means, and a second group of physical operating conditions determined in advance with respect to a system which includes the robot, converting the resulting group of operating conditions into an operating command for the robot, and automatically incorporating the operating command into the designated position in said operating program.

20. The programming pendant according to claim 19, wherein said language processing means modifies orientation information of a taught motion command according to data indicative of an orientation of the robot in the group of operating conditions read from said database.

21. The programming pendant according to claim 19, wherein said language processing means modifies orientation information of a taught motion command according to data indicative of an orientation of the robot in the group of operating conditions resulting from said database, and automatically adds orientation changing points to precede and follow the taught motion command in order to keep a relative orientation between a workpiece and an operating tool in conformity with the orientation from said database as much as possible.

22. A programming pendant for teaching an industrial robot, comprising:
   display means for graphically displaying a picture and capable of designating a position in the displayed picture with pointing means;
   storage means for storing operating programs which contain target positional data for the robot described as motion commands; and
   language processing means for displaying symbols representing said operating programs on said display means, storing an associating relationship between said symbols and said operating programs in said storage means, and processing one of the operating programs which corresponds to either one of the symbols when said either one of the symbols is designated by said pointing means.

23. The programming pendant according to claim 22, wherein said symbols are handwritten in a screen on said display means with said pointing means.

24. The programming pendant according to claim 19, wherein said language processing means displays time-series numbers of the motion commands described in said operating program in superimposed relation to the displayed picture on said display means, and when a range of time-series numbers is designated by said pointing means, said language processing means displays only a path of an interval of corresponding motion commands on said display means.

25. The programming pendant according to claim 19, wherein said language processing means calculates an angle formed between a straight line passing through two teaching positions on a workpiece and the ground from two successive teaching positions of the motion commands, and registers the calculated angle as an element of said first group of physical operating conditions.

26. The programming pendant according to claim 19, wherein positional data of said robot are written as three-dimensional data of a reference point in said operating program, and said language processing means displays the three-dimensional data of the reference point stored in said storage means on said display means.

27. The programming pendant according to claim 19, wherein said language processing means calculates an angle through which a workpiece rotates about an axis as a straight line passing through two successive teaching positions of the motion commands on said workpiece, from said two successive teaching positions and three-dimensional data of a reference point stored in said storage means, and registers the calculated angle as an element of said first group of physical operating conditions.

28. The programming pendant according to claim 19, wherein said language processing means automatically establishes a shape and dimensions of a workpiece based on said first group of physical operating conditions and said second group of physical operating conditions, and three-dimensionally displays the shape of the workpiece between two successive teaching positions of the motion commands on said display means.

29. The robot language processing apparatus according to claim 4, wherein said language processing apparatus displays all orientations of a tool at teaching positions of the motion commands which correspond to the time-series numbers of the motion commands on said display means.

30. The robot language processing apparatus according to claim 4, wherein, if a type of interpolation of a motion command expressed by an intermediate code is circular interpolation, and the number of teaching points is smaller than a number required for circular interpolation, then said language processing apparatus changes the type of a displayed line to indicate that said robot cannot move along an arcuate path on said display means.

31. The robot language processing apparatus according to claim 30, wherein if the type of interpolation of the motion command expressed by the intermediate code is circular interpolation, and there is one time-series teaching point for circular interpolation, then said language processing apparatus automatically generates an operating program for linear interpolation.

32. The robot language processing apparatus according to claim 30, wherein if the type of interpolation of the motion command expressed by the intermediate code is circular interpolation, and there are two time-series teaching points for circular interpolation and there is another motion command for which another type of interpolation is designated, successive to the teaching points in a time-series manner, then said language processing apparatus automatically adds a motion command at the same position and orientation as said other motion command for which the other type of interpolation is designated thereby enabling said robot to move along the arcuate path.

33. The programming pendant according to claim 4, wherein when supplied with a gap distance corresponding to a line displayed on said display means, said language processing means displays said line again as dual lines spaced from each other by a distance corresponding to said gap distance.

34. The programming pendant according to claim 21, wherein, for automatically adding an orientation changing point, said language processing means stores information related to a motion command which is already taught, in said storage means in association with a motion command of the orientation changing point to be added.

35. The programming pendant according to claim 34, wherein, for deleting a motion command which is already taught, after said motion command is deleted, said language processing means searches said storage means, and deletes a motion command of an orientation changing point with which information related to the deleted motion command is associated.

36. The programming pendant according to claim 34, wherein for modifying the position of a motion command which is already taught, after said position of the motion command is modified, said language processing means searches said storage means, and corrects positional information of a motion command of an orientation changing point with which information related to the modified motion command is associated, at an appropriate position.

* * * * *